US007013196B2

(12) United States Patent
Magario et al.

(10) Patent No.: US 7,013,196 B2
(45) Date of Patent: Mar. 14, 2006

(54) MOLDING MACHINE CONTROL SYSTEM

(75) Inventors: Takashi Magario, Nagano (JP);
Yoshitomi Uchikawa, Nagano (JP);
Kazuo Usui, Nagano (JP)

(73) Assignee: Nissei Plastic Industrial Co., Ltd., Nagano (JP)

( * ) Notice: Subject to any disclaimer, the term of this patent is extended or adjusted under 35 U.S.C. 154(b) by 0 days.

(21) Appl. No.: 10/700,881

(22) Filed: Nov. 3, 2003

(65) Prior Publication Data

US 2004/0093114 A1 May 13, 2004

(30) Foreign Application Priority Data

| Nov. 6, 2002 | (JP) | ............................ 2002-322904 |
| Nov. 6, 2002 | (JP) | ............................ 2002-322915 |
| Nov. 6, 2002 | (JP) | ............................ 2002-322965 |

(51) Int. Cl.
*G06F 19/00* (2006.01)
(52) U.S. Cl. ...................... 700/204; 700/197
(58) Field of Classification Search ................ 700/117, 700/149, 188, 197, 200–205; 702/46; 703/17; 706/21; 435/169–173
See application file for complete search history.

(56) References Cited

U.S. PATENT DOCUMENTS

| 5,792,395 | A | * | 8/1998 | Ito et al. ..................... 264/40.1 |
| 5,819,281 | A | * | 10/1998 | Cummins ................ 707/103 R |
| 6,496,751 | B1 | * | 12/2002 | Salvo et al. ................. 700/196 |
| 2002/0031567 | A1 | * | 3/2002 | Magario ...................... 425/135 |
| 2002/0165998 | A1 | * | 11/2002 | Hrebejk et al. ............. 709/318 |
| 2002/0188374 | A1 | * | 12/2002 | Urabanek .................... 700/200 |
| 2003/0018829 | A1 | * | 1/2003 | Carney et al. .............. 709/321 |
| 2003/0139176 | A1 | * | 7/2003 | Fujiwara et al. ............ 455/420 |
| 2004/0030775 | A1 | * | 2/2004 | Lauzon et al. .............. 709/224 |

FOREIGN PATENT DOCUMENTS

JP         2002086531 A         3/2002

* cited by examiner

*Primary Examiner*—Chad Rapp
(74) *Attorney, Agent, or Firm*—Hamre, Schumann, Mueller & Larson, P.C.

(57) ABSTRACT

A control system for controlling the operation of a molding machine and its peripheral machines. This control system automatically transmits an advance notification of for example completion of production by the molding machine to an operator by electronic mail. The system includes a destination mail address setting part and an automatic electronic mail distributing part. The destination mail address setting part automatically specifies a transmission destination before a predetermined event such as for example the completion of production at the molding machine occurs. The automatic electronic mail distributing part automatically distributes an advance notification of the predetermined event to the transmission destination before the event occurs.

17 Claims, 25 Drawing Sheets

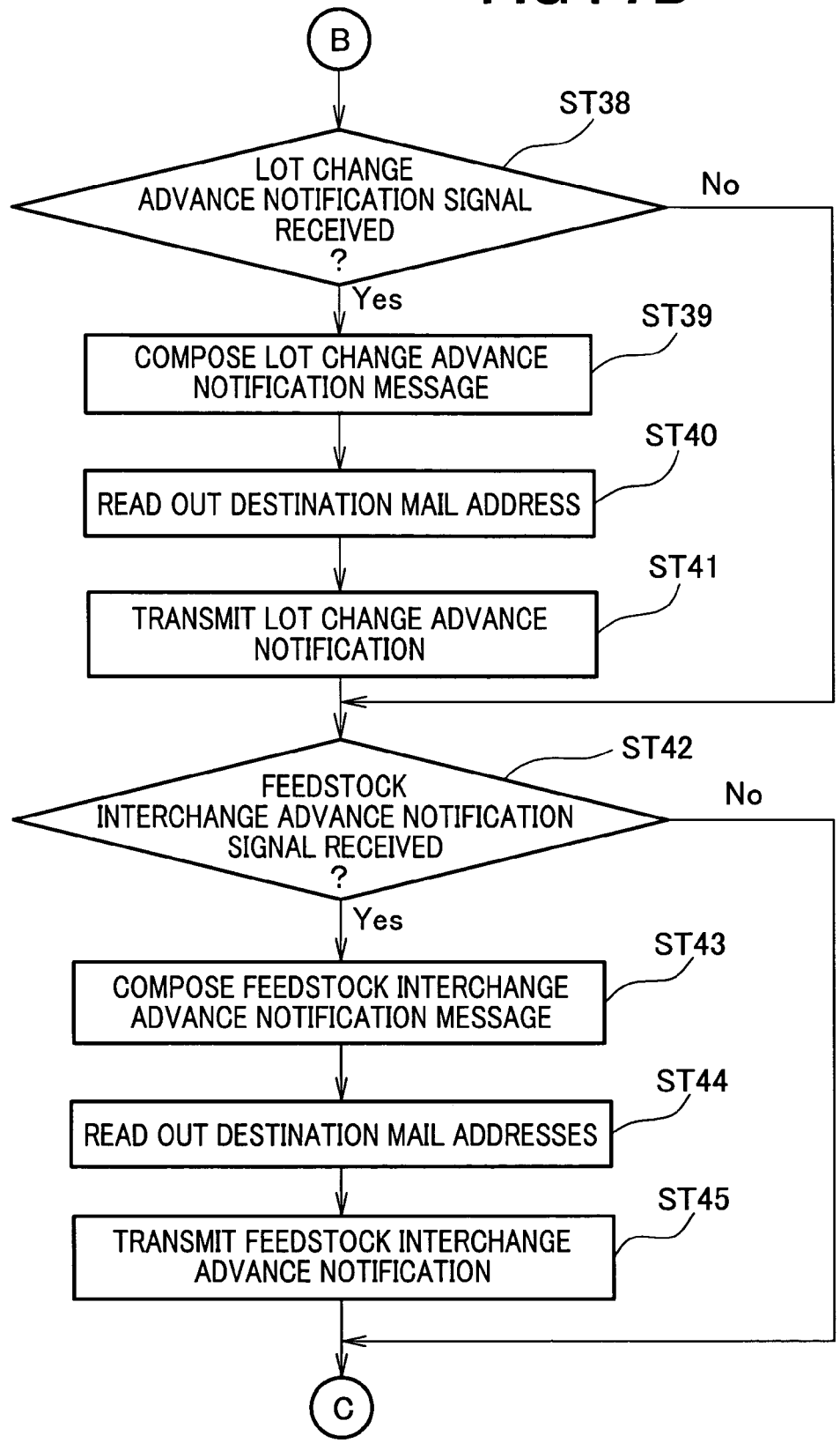

EVENTS OF WHICH ADVANCE
NOTIFICATION IS REQUIRED

| | | |
|---|---|---|
| CASE COMPLETION ADVANCE NOTIFICATION | ON | OFF |
| LOT CHANGE ADVANCE NOTIFICATION | ON | OFF |
| FEEDSTOCK INTERCHANGE ADVANCE NOTIFICATION | ON | OFF |
| MOLDING MACHINE STOPPAGE ADVANCE NOTIFICATION | ON | OFF |
| MOTOR PROBLEM | ON | OFF |

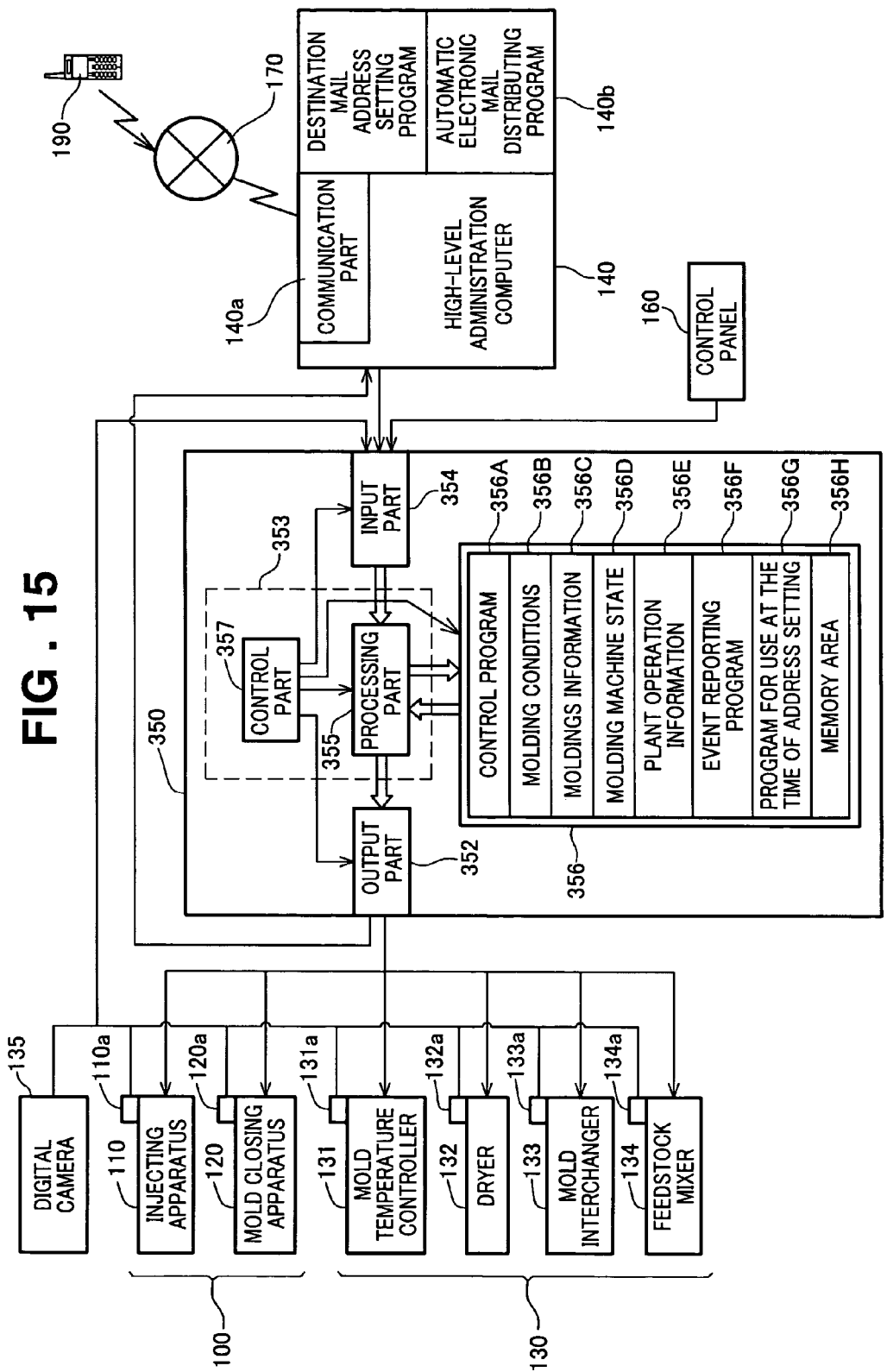

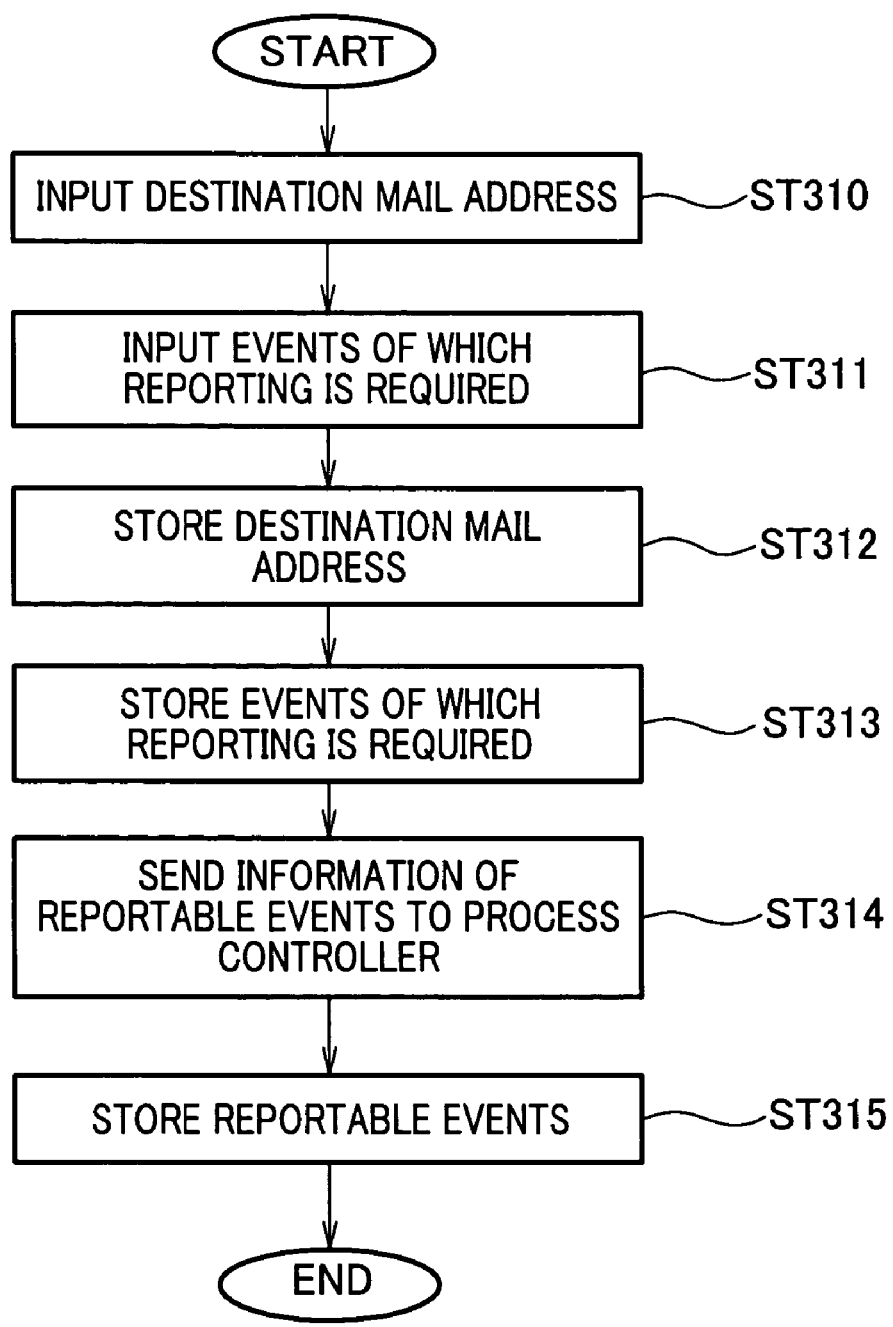

MOLDING MACHINE CONTROL SYSTEM

FIELD OF THE INVENTION

This invention relates to a control system of a molding machine, and particularly to a control system with which it is possible to perform monitoring, administration and control of a molding machine from a remote location or while on the move by using a mobile telephone or a portable information terminal and the Internet.

BACKGROUND OF THE INVENTION

In monitoring, administration and control systems of molding machines, methods wherein the Internet or a telephone line is used as means for checking the plant operation status and production results of a molding machine in a molding factory from a remote location are known, for example from JP-A-2002-86531.

A molding machine monitoring, adminstration and control system of this kind has a function giving advance notification of production run completion a set time before or set number of shots before the completion of production, and on the basis of this advance notification of production run completion a technician can raise work efficiency by carrying out preparation for the next production run or preparation for production run completion in advance.

However, in accessing a network directly via the Internet there are problems of global address acquisition and security, and in practice it has been difficult to make it possible for anyone to connect and view information easily. To make it possible for anyone to connect and view information easily, the construction of an in-company intranet and Web servers has been necessary. When advance notification of production run completion is provided as it has been in molding machine monitoring, adminstration and control systems of related art, there has been the problem that unless the technician is near the molding machine or near a monitoring/administration/control system inside the molding factory, it has not been possible for the technician to see the advance notification of production run completion. Also, in the checking of the plant operation status and production results of a molding machine from a remote location, there has been the problem that unless a plant operation status checking procedure is carried out from the remote location, the information is not delivered. Furthermore, there has been the problem that when among events occurring at a molding machine an event has arisen of which a technician or a manager must be informed, it is difficult for them to be informed immediately in a remote location.

Accordingly, there has been a need for a molding machine control system which makes it possible to receive advance notifications of predetermined events such as production run completion; to view the plant operation status and production results of molding machines; and to obtain reports of events occurring at molding machines of which a manager or other needs to be informed, all from a remote location.

SUMMARY OF THE INVENTION

The present invention provides a control system of a molding machine for controlling the operation of at least one molding machine and/or a plurality of peripheral machines supporting the running of the molding machine, the control system including: a communication part connected to an electrical communication network, for effecting communication with an outside terminal via the electrical communication network; transmission destination specifying means for, before a predetermined event occurs at the molding machine and/or the plurality of peripheral machines, automatically specifying in advance a transmission destination to be the destination of an advance notification of the event; automatic distributing means for, before the predetermined event occurs at the molding machine and/or the plurality of peripheral machines, automatically distributing an advance notification of the predetermined event to the transmission destination; and transmitting means for, before the predetermined event occurs at the molding machine and/or the plurality of peripheral machines, transmitting the advance notification of the predetermined event to the transmission destination.

This control system is made up of for example a process controller provided in the molding machine and a high-level computer.

With a control system according to the invention, because advance notification of a predetermined event is sent from inside the factory by transmitting means using an electrical communication network, at an external terminal receiving this advance notification it is possible to ascertain the expected time of the predetermined event and to find out the status of the molding machine quickly. By the advance notification of the predetermined event being sent by transmitting means using an electrical communication network, it is made possible for advance notification of a predetermined event to be delivered to an outside terminal carried by a technician. Also, an advance notification of a predetermined event can be received with an outside terminal wherever a technician is, and work efficiency can be raised.

In this control system, preferably, the predetermined event is the completion of a production run. Because an advance notification of production run completion is sent from the factory by transmitting means using an electrical communication network, at the outside terminal receiving this advance notification of production run completion it is possible to ascertain the estimated time of the production run completion and to find out the status of the molding machine quickly. By the advance notification of production run completion being sent by transmitting means using an electrical communication network, it is made possible for the advance notification of production run completion to be delivered to an outside terminal carried by a technician. Also, an advance notification of production run completion can be received with an outside terminal wherever a technician is, and work efficiency can be raised.

Also, in a control system according to the invention, preferably, the predetermined event is at least one of a case run completion, a feedstock interchange, and an abnormality of the molding machine. That is, because an advance notification of a case run completion, a feedstock change or an abnormality of the molding machine is sent from the factory, at the outside terminal receiving this it is possible to ascertain the expected time of the case run completion, feedstock change or abnormality of the molding machine and to understand the status of the molding machine quickly. By the advance notification of a case run completion, feedstock change or abnormality of the molding machine being sent by transmitting means using an electrical communication network, it is made possible for the advance notification of the case run completion, feedstock change or abnormality of the molding machine to be delivered to an outside terminal carried by a technician. Also, an advance notification of a case run completion, feedstock change or abnormality of the molding machine can be received with an outside terminal wherever a technician is, and work efficiency can be raised.

The electrical communication network in a control system according to the invention is preferably either the Internet, a LAN, a telephone line or a wireless line.

The transmitting means is preferably electronic mail. Because an advance notification of a predetermined event is sent by electronic mail, at an outside terminal receiving this electronic mail it is possible to ascertain the expected time of the predetermined event and understand the status of the molding machine quickly just by opening the electronic mail. By the advance notification of a predetermined event being sent by electronic mail, it is made possible for the advance notification of the predetermined event to be delivered to a mobile telephone, portable terminal, notebook computer or other computer carried by a technician. Also, an advance notification of a predetermined event can be received wherever the technician is, and work efficiency can be raised.

The outside terminal of the control system is preferably a mobile telephone or a computer. Although there are various types of outside terminal, generally Web or Internet connectable mobile telephones and computers are preferable.

The invention also provides a control system of a molding machine for controlling the operation of at least one molding machine and/or a plurality of peripheral machines supporting the running of the molding machine, the control system including: a communication part connected to an electrical communication network, for effecting communication with an outside terminal via the electrical communication network; transmission destination specifying means for automatically specifying in advance a transmission destination for production data of the molding machine to be transmitted to at a predetermined time; automatic distributing means for automatically distributing the production data of the molding machine to the transmission destination specified by the transmission destination specifying means at the predetermined time; and transmitting means for transmitting the production data of the molding machine to the transmission destination at the predetermined time.

The control system is for example made up of a process controller of a molding machine and a high-level computer.

With this control system, because required data is sent regularly from the factory at set times when it is needed, plant operation status and production results can be viewed easily using an outside terminal. This is possible without a special application at the receiving terminal. Also, a system can be created easily using a network or telephone lines. As long as Internet connecting means are available, a system for collecting production data from anywhere in the world can be created without the need to provide special infrastructure such as an intranet or Web servers.

The production data preferably includes as least one data item from among plant operation status, fulfillment rate, plant operation rate, number of good units and number of defective units, which are results data, and cycle time, lot number, product number, planned production number, number of cavities, and estimated time of production run completion, which are data attendant to results data. Accordingly, because required data is sent from the factory regularly at set times when it is needed, plant operation status and production results can be viewed easily using an outside terminal.

The electrical communication network is preferably the Internet, a LAN, a telephone line or a wireless line.

The transmitting means is preferably electronic mail. Because required data is sent regularly from the factory by electronic mail at set times when it is needed, at an outside terminal receiving this electronic mail it is possible to view the plant operation status and production results easily just by opening the electronic mail. This is possible without a special application at the receiving terminal. Also, a system can be created easily using a network or telephone lines. As long as Internet connecting means are available, a system for collecting production data from anywhere in the world can be created without the need to provide special infrastructure such as an intranet or Web servers.

The outside terminal of the control system is preferably a mobile telephone or a computer. Although there are various types of outside terminal, generally Web or Internet connectable mobile telephones and computers are preferable.

The invention also provides a control system of a molding machine for controlling the operation of at least one molding machine and/or a plurality of peripheral machines supporting the running of the molding machine, the control system including: a communication part connected to an electrical communication network, for effecting communication with an outside terminal via the electrical communication network; transmission destination specifying means for automatically specifying a transmission destination for, when a predetermined event has occurred at the molding machine, a report that the predetermined event has occurred to be transmitted to; automatic distributing means for, when a predetermined event has occurred at the molding machine, automatically distributing a report that the predetermined event has occurred to the transmission destination specified with the transmission destination specifying means; and transmitting means for, when a predetermined event has occurred at the molding machine, transmitting a report that the event has occurred to the transmission destination.

With this control system, because a report of a predetermined event is sent from the factory, the person receiving this report can know that the predetermined event has occurred and can then issue instructions in response to the event which has occurred at the factory from a remote location.

In this control system, preferably, the predetermined event is at least one of a change of molding conditions, completion of production, an abnormality occurrence, a device failure, a running mode change, a lot change, a case change and a setup item plan. When a mail reporting a change of molding conditions, completion of production, an abnormality occurrence, a device failure, a running mode change, a lot change, a case change or a setup item plan is sent from the factory like this, the recipient can ascertain the change of molding conditions, completion of production, abnormality occurrence, device failure, running mode change, lot change, case change or setup item just by opening the electronic mail, and can issue instructions in response from a remote location.

In this control system, preferably, the electrical communication network is the Internet, a LAN, a telephone line or a wireless line.

In this control system, preferably, the transmitting means is electronic mail. When an electronic mail of a report of a predetermined event having occurred is sent from the factory like this, the recipient of the electronic mail can learn that the predetermined event has occurred just by opening the electronic mail, and can issue instructions in response to events occurring at the molding site from a remote location.

The outside terminal of the control system is preferably a mobile telephone or a computer. Although there are various types of outside terminal, most generally Web or Internet connectable mobile telephones and computers are preferable.

BRIEF DESCRIPTION OF THE DRAWINGS

Certain preferred embodiments of the present invention will be described in detail below, by way of example only, with reference to the accompanying drawings, in which:

FIG. 7A, FIG. 7B and FIG. 7C are flow charts of an automatic electronic mail distributing program of automatic electronic mail distributing means of the first preferred embodiment;

FIG. 9 is a view showing a screen for registering events of which advance notification is required of the first preferred embodiment;

FIG. 15 is an electrical function block diagram showing the construction of a control system of a third preferred embodiment centered on a process controller;

FIG. 16 is a flow chart of a setting program of destination mail address setting means of the third preferred embodiment;

DETAILED DESCRIPTION OF THE PREFERRED EMBODIMENTS

Figure 1:
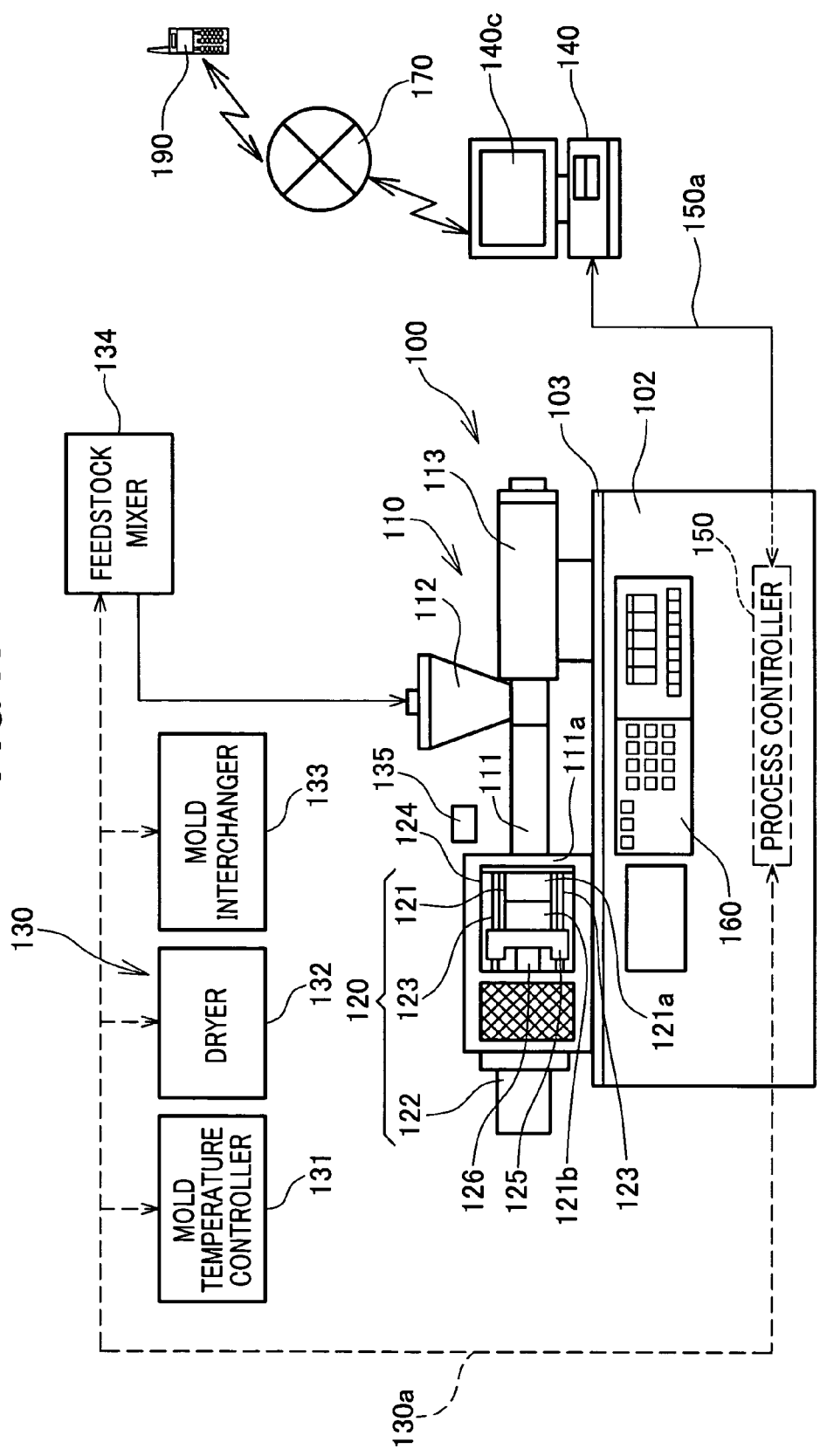
FIG. 1 is a system construction view showing an injection molding machine and peripheral machines and a control system to which the invention is applied.

Initial reference is made to FIG. 1 showing an injection molding machine serving as an example of a molding machine to which the control system of the invention is applied. The injection molding machine 100 shown in FIG. 1 has a bed 103 on a support plinth 102 and has an injecting apparatus 110 and a mold closing apparatus 120 provided on the bed 103. A digital camera (or a digital video camera or a video camera) 135 for picking up images of moldings is provided near the mold closing apparatus 120 of the injection molding machine 100. Peripheral machines 130 auxiliary to injection molding plant operation are disposed around the injection molding machine 100. The peripheral machines 130 include for example a mold temperature controller 131, a dryer 132, a mold interchanger 133 and a feedstock mixer 134. A high-level computer 140 for administration is also provided with respect to the injection molding machine 100.

A process controller 150 consisting of a microcomputer is provided in the support plinth 102. A control panel 160 with numerous control keys arranged on it is provided on an outside face of a side of the support plinth 102. Instructions needed for molding work are inputted using the control keys on the control panel 160.

The injecting apparatus 110 is made up of a heating cylinder 111 for plasticizing a plastic feedstock, a hopper 112 for holding plastic feedstock to be supplied to the heating cylinder 111, and an injecting cylinder 113. A screw is normally mounted inside the heating cylinder 111. Plastic feedstock supplied from the hopper 112 to the inside of the heating cylinder 111 is heated by a heater (not shown) wound around the heating cylinder 111 and plasticized while being metered and fed by the rotary movement of the screw to the end of the screw and injected through a tip nozzle 111a. As the drive source of the injecting cylinder 113, a hydraulic drive device or an electric drive device is used.

The mold closing apparatus 120 has a mold 121, and when plastic injected through the tip nozzle 111a of the heating cylinder 111 has filled this mold 121 and cooled and hardened, it opens the mold 121 and ejects a molding. The mold closing apparatus 120 has a mold closing cylinder 122.

In the mold closing apparatus 120, for example four tie bars 123 are arranged horizontally. A fixed plate 124 is fixed to the ends of the tie bars 123, and a movable plate 125 is fitted on the tie bars 123 and is movable along them.

The movable plate 125 is moved by a piston rod 126 of the mold closing cylinder 122. A fixed die 121a is mounted on the fixed plate 124. A moving die 121b is mounted on the movable plate 125. The fixed die 121a and the moving die 121b form the mold 121. The movable plate 125 is moved toward the fixed plate 124 by the action of the mold closing cylinder 122 and the piston rod 126. The mold 121 is formed when the fixed die 121a and the moving die 121b are brought together. Cavities for shaping a molding are formed in the opposing faces of the fixed die 121a and the moving die 121b.

Plasticized plastic feedstock is forced from the tip nozzle 111a of the heating cylinder 111 into the internal space of the mold 121 through the fixed plate 124. When the heating cylinder 111 carries out injection of the plastic feedstock, so that the mold 121 does not open, a strong clamping force is applied to it by the mold closing cylinder 122.

In the plant operation state of the injection molding machine 100, wherein it makes moldings continuously, the respective operations of the injecting apparatus 110 and the mold closing apparatus 120 are repeated in a fixed order. This order of operations is imposed by sequence control carried out by the process controller 150.

During injection molding work based on the operations of the injecting apparatus 110 and the mold closing apparatus 120 in the injection molding machine 100, in cooperation with the operation of the injection molding machine 100, which is the main machine, the peripheral machines 130 such as the mold temperature controller 131, the dryer 132, the mold interchanger 133 and the feedstock mixer 134 operate, and support the injection molding production work.

The mold temperature controller 131 is a machine for controlling the temperature of the mold 121. The dryer 132 is a machine for drying the molded material. The mold interchanger 133 is a machine for interchanging molds 121 in correspondence with different moldings. The feedstock mixer 134 is a machine for, when a plurality of feedstocks are used, mixing these and supplying them to the hopper 112. As other peripheral machines 130 besides these there are a removal robot, a feedstock supply apparatus, a carrying conveyor, a runner crusher, and a cooling apparatus, but these are not shown in FIG. 1.

The respective operations of the peripheral machines 130 are controlled by the process controller 150 of the injection molding machine 100, as shown by the dashed lines 130a. The operating states of the peripheral machines 130 are detected by corresponding detectors, and information relating to these operating states is fed to the process controller 150.

As mentioned above, a high-level computer 140 for administration is provided with respect to the injection molding machine 100. The high-level computer 140 is connected to the process controller 150 of the injection molding machine 100 by a communication cable 150a. The high-level computer 140 can be disposed near the place where the injection molding machine 100 is installed, or can be disposed in a remote location via communication means. When a high-level computer 140 disposed in a remote location is connected to the process controller 150, they each have a communication control part and a communication part and exchange data and so on via the communication cable 150a functioning as a communication line.

The high-level computer 140 has the function of directing and administering the plant operation states of the injection molding machine 100 and the peripheral machines 130 such as the mold temperature controller 131 via the process controller 150. Although in FIG. 1 only one injection molding machine 100 is shown, in practice a number of injection molding machines having a similar construction are provided. Accordingly, the high-level computer 140 is constructed to administer the plant operation of multiple injection molding machines.

Next, the construction of a molding machine control system according to a first preferred embodiment of the invention will be described, on the basis of the electrical function block diagram shown in FIG. 2. This control system performs monitoring, administration and control of the injection molding machine 100 and the peripheral machines 130.

The objects controlled by the process controller 150 are the injecting apparatus 110 and the mold closing apparatus 120 of the injection molding machine 100 and the mold temperature controller 131, the dryer 132, the mold interchanger 133 and the feedstock mixer 134 among the peripheral machines 130.

In the injecting apparatus 110 and the mold closing apparatus 120 in the injection molding machine 100, various valve mechanisms of hydraulic drive devices and various electric drive mechanisms included as drive devices of these apparatus are also among the objects of control.

The injecting apparatus 110, the mold closing apparatus 120, the mold temperature controller 131, the dryer 132, the mold interchanger 133 and the feedstock mixer 134 each receive command signals for directing their operation from an output part 152 of the process controller 150.

The injecting apparatus 110, the mold closing apparatus 120, the mold temperature controller 131, the dryer 132, the mold interchanger 133 and the feedstock mixer 134 are respectively provided with detectors 110a, 120a, 131a, 132a, 133a and 134a for detecting the operating states of those devices. Although in the example shown in the figure only one detector is shown on each device, in practice each detector is made up of a group of sensors, to detect various state values. Detection signals outputted from the detectors 110a, 120a, 131a, 132a, 133a and 134a are inputted to an input part 154 of the process controller 150.

The process controller 150 is made up of the above-mentioned output part 152, a CPU 153, an input part 154 and a memory part 156. The CPU 153 includes a processing part 155 and a control part 157.

The processing part 155 takes control programs and data relating to various information such as molding conditions from the memory part 156 and controls the operation of the injection molding machine 100 and the operation of the peripheral machines 130 to execute continuous production of moldings by injection molding and maintain the injection molding plant operation/running of the injection molding machine 100.

The memory part 156 stores at least a control program 156A for various operations, molding conditions data 156B, moldings information data 156C, data 156D relating to the state of the injection molding machine 100, and data 156E relating to plant operation information.

Also, the memory part 156 has an advance event notification program 156F, a program for use at the time of address setting 156G, and memory areas 156H, 156I for storing events of which advance notification is required and advance event notification shot counts, all of which will be discussed in detail later.

Included in the control program 156A is information relating to operation control of the injection molding machine 100, operation control of various devices included in the peripheral machines 130, and a production plan.

Included in the data 156D relating to the state of the molding machine are for example shot counts, the I/O state of the injection molding machine 100, pump command values, motor command values, motor load torque monitor, detector voltages and other maintenance information, error occurrence data, and production numbers.

Included in the moldings information 156C are for example shot-by-shot monitor data and molding image data. The molding image data is obtained as images of moldings picked up by the digital camera 135 mounted in the vicinity of the mold closing apparatus 120 of the injection molding machine 100.

Included in the plant operation information data 156E are data relating to the plant operation state of the injection molding machine 100 and data relating to the plant operation states of the peripheral machines 130.

When the process controller 150 is constituted in a system such that it conducts communication with a high-level computer 140 in a remote location, in the memory part 156 a communication control program for executing communication with the high-level computer 140 is provided, and a communication control part is formed.

The above-mentioned programs and data can be written and read freely, and can be changed freely in accordance with circumstances. This writing/reading and changing of content can be carried out freely even from an outside, remote location. Thus, the control programs and data can be changed in the production site where the injection molding machine 100 is located, or remote control from a remote location can be carried out.

The control part 157 controls the operations of the output part 152, the input part 154, the processing part 155 and the memory part 156, and administers the operation of the process controller 150 as a whole.

With the process controller 150 described above, mainly, sequence control for producing moldings repeatedly in a predetermined procedure in the injection molding machine 100, process control relating to the operating states of different parts of the injection molding machine 100 and so on, and indirect quality determination control relating to the quality of moldings are executed.

As mentioned above, connected to the process controller 150 having this construction are a control panel 160 and a high-level computer 140. As mentioned above with reference to FIG. 1, the control panel 160 is provided on the support plinth 102 of the injection molding machine 100.

The high-level computer 140 is an administration device for providing control programs specifying production plans and plant operation/running procedures and data for specifying settings/changes of molding conditions to the process controller 150 of the injection molding machine 100. Also, information relating to the operating state of the injection molding machine 100 and the operating states of the peripheral machines 130, sent to the process controller 150 by the detectors 110a, 120a, 131a, 132a, 133a and 134a and stored in the memory part 156 of the process controller 150, is fed to the high-level computer 140.

The high-level computer 140 has a communication part 140a and a memory part 140b. The high-level computer 140 is connected by the communication part 140a to the Internet (or to a portable information terminal network) 170, and is capable of conducting communication with an outside Internet terminal. In FIG. 2, a mobile telephone 190 is shown as one example of an outside Internet terminal. The mobile telephone 190 is but one example, and any information terminal can be used as the Internet terminal. As the information terminal, from the point of view of simplicity of operation and ease of handling, a portable information terminal or a PDA is preferable. The high-level computer 140 has destination mail address setting means and automatic electronic mail distributing means, which will be discussed in detail later, and a destination mail address setting program and an automatic electronic mail distribution program are stored in the memory part 140b.

Figure 2:
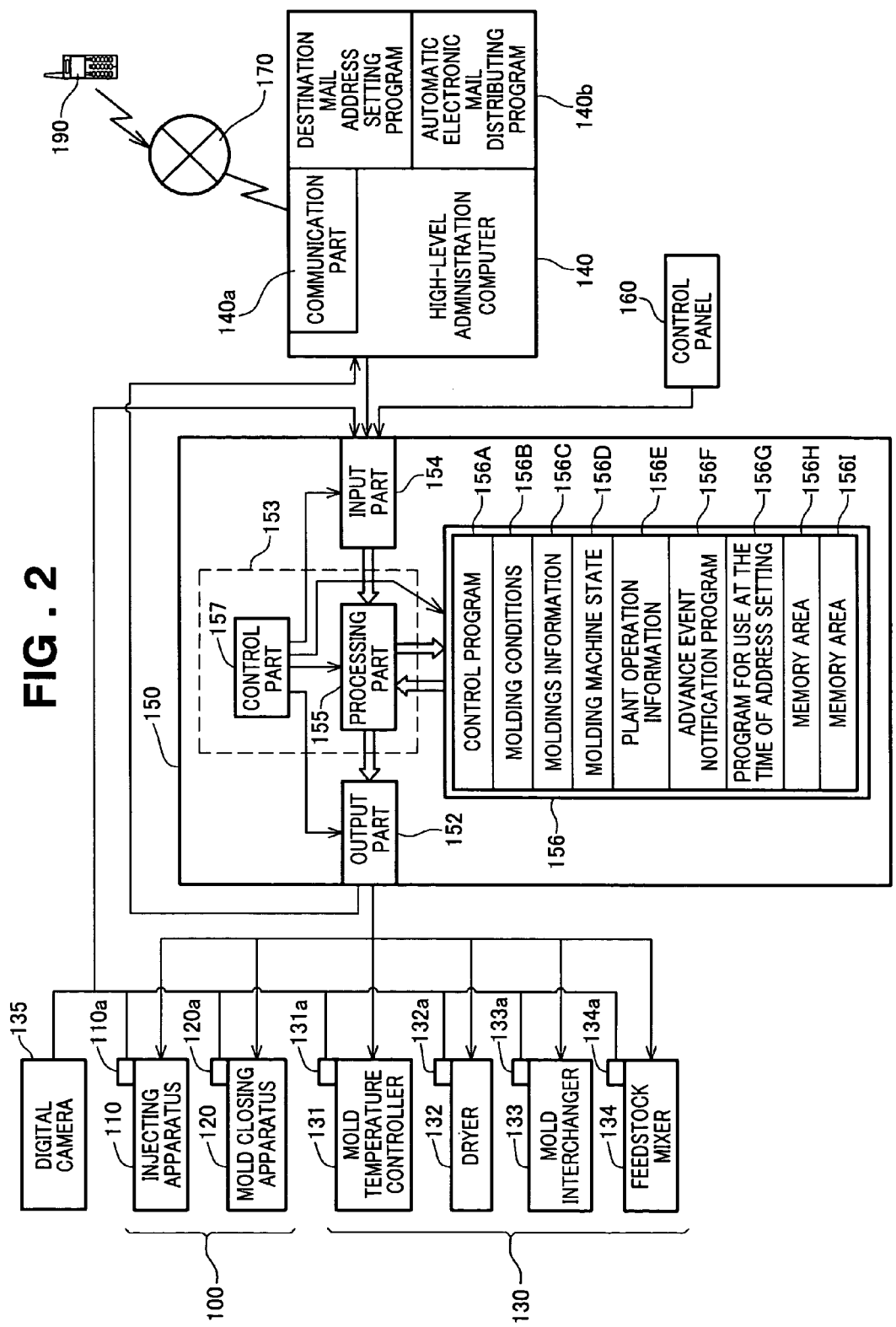
FIG. 2 is an electrical function block diagram showing the construction of a control system of a first preferred embodiment centered on a process controller.

With the construction shown in FIG. 1 and FIG. 2, in the production of moldings by injection molding with the injection molding machine 100, continuous automatic production is carried out under the control of the process controller 150. At this time, the communication cable 150a (or a dedicated line) is connected between the process controller 150 and the high-level computer 140, and the control program 156A and various data stored in the memory part 156 of the process controller 150 are administered and changed by means of the high-level computer 140. The high-level computer 140 for administration is connected by the communication part 140a by way of the Internet 170 to the mobile telephone 190 in a remote location, as shown in FIG. 2. With this construction, by operating the mobile telephone 190 an administrator in a remote location can access the high-level computer 140 via the Internet 170.

The high-level computer 140 for administration functions as a host computer, and also has a DNS (Domain Name System) function, and can distribute and receive various data relating to information about the injection molding machine 100 including control programs through the Internet 170. The DNS function realizes a DNS server. Therefore, while in a remote location, using a mobile telephone 190, by means of a browser function and an electronic mail function thereof, an administrator can obtain various information about the injection molding machine 100 and the peripheral machines 130 through the Internet 170 and can also issue instructions and commands.

As mentioned above, the high-level computer 140 has a DNS function, and therefore when from a mobile telephone 190 through the Internet 170 with respect to the high-level computer 140 its DNS server address is accessed, needed information can be obtained from a menu screen thereof through the browser. Menu content shown on the menu screen includes for example molding machine information, production information, molding conditions administration information, product information, and peripheral machine information. This information is supplied to the high-level computer 140 from the process controller 150. It is also possible to adopt a construction wherein the connection to the own company server is made by a dial-up connection through another provider.

The details of the above-mentioned menu content are as follows. Molding machine information is information on the state and maintenance and so on of the molding machine. Production information is product currently being produced, planned production number, actual production number, number of error occurrences, plant operation time, estimated time of finishing, and so on. Molding conditions administration information is references of molding conditions of molding currently in progress, and so on. As quality management information, information on products of which molding is currently in progress and monitor data can be referred to in real time. Product information is product information of molding currently in progress and shot-by-shot molding images. Peripheral machine information is state and settings information of the connected peripheral machines.

With respect to the above-mentioned menu content displayed on the menu screen of the high-level computer 140 on the basis of its DNS server function, the following operations can be carried out by means of the mobile telephone 190.

First, the planned production number, of the production information, can be changed. When the high-level computer 140 receives a change of a planned production number through its DNS function, by way of the communication cable 150a it changes data relating to the planned production number in the memory part 156 of the process controller 150.

Of the molding conditions administration information, each of a number of molding conditions can be changed. When through the DNS function the high-level computer 140 receives a change of production plan relating to molding conditions, by way of the communication cable 150a it changes data relating to molding conditions in a production plan in the memory part 156 of the process controller 150. Molding monitor data altered by this change can be obtained one by one by way of the menu screen. Moldings produced on the basis of specified molding conditions can be imaged with the digital camera and this image data downloaded and checked with a terminal such as the mobile telephone 190. The product information also can be extracted by download.

When an abnormal state has arisen in the injection molding machine 100 or the peripheral machines 130, the electronic mail function provided in the high-level computer 140 is used as means to notify an administrator of the abnormality by means of the mobile telephone 190. That is, when an abnormality has arisen in the injection molding machine 100, the peripheral machines 130 or in moldings, the process controller 150 receiving this information reports it to the high-level computer 140. Then, on the basis of a pre-registered address, the high-level computer 140 then uses electronic mail to report for example the equipment in which the abnormality has arisen and the nature of the abnormality to the mobile telephone 190. The mobile telephone 190, when it receives the electronic mail, emits a sound announcing an incoming transmission. By checking the received mail, the recipient can find out about the abnormality of the operating state of the injection molding machine 100 or other equipment. When necessary, by means of the mobile telephone 190, by way of the Internet 170 and the high-level computer 140, a maintenance response can be issued from the remote location.

Figure 3:
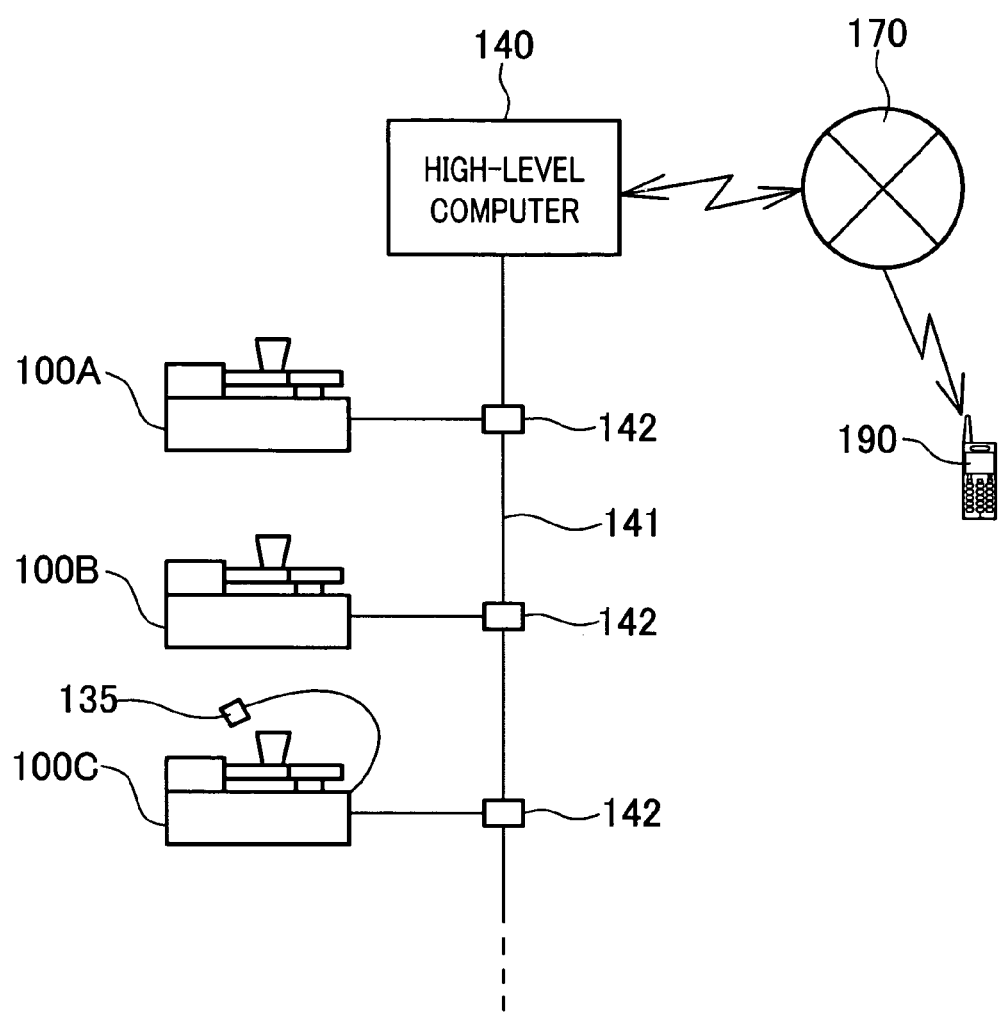
FIG. 3 and FIG. 4 are construction views of a control system according to the invention for controlling multiple injection molding machines.
Figure 4:
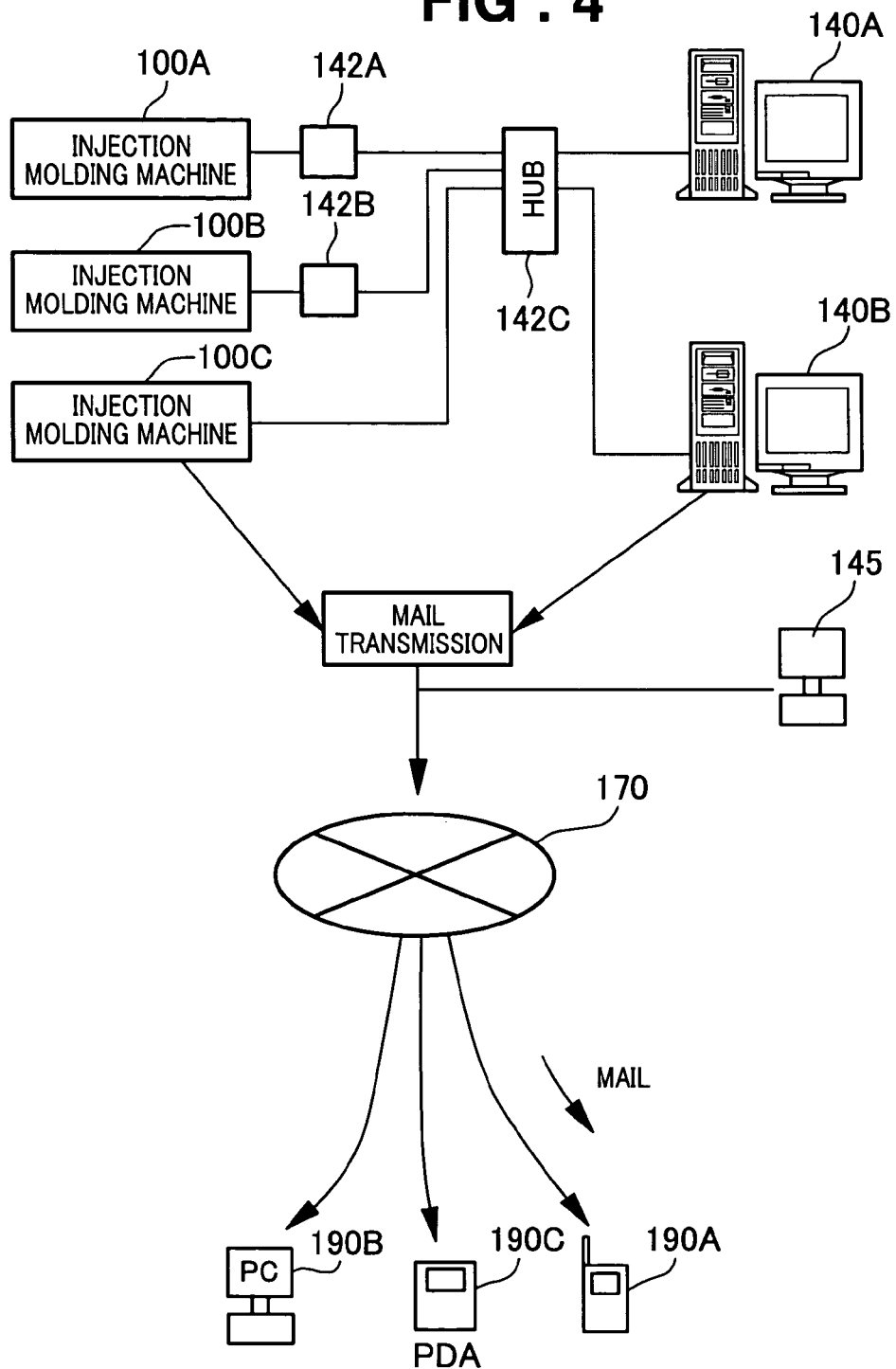

FIG. 3 and FIG. 4 show a system construction wherein there are provided a plurality of injection molding machines 100A, 100B, 100C . . . according to the invention, and their process controllers are connected to a high-level computer 140 (in FIG. 4, high-level computers 140A, 140B) by a LAN communication cable 141 and connecting devices 142 (in FIG. 4, adapters 142A, 142B and a HUB 142C).

The detailed constructions of the injection molding machines 100A through 100C and the high-level computer 140 are the same as those described above. The high-level computer 140 is constructed so that it can connect to a mobile telephone 190A, a computer 190B or a PDA 190C through the Internet 170, and can exchange information, data and instructions as in the preferred embodiment described above.

As shown in FIG. 4, it is also connected by a company LAN to a company computer 145. With the construction of this preferred embodiment, monitoring, administration and control of a plurality of injection molding machines and so on can be carried out.

Whereas FIG. 3 shows an example in which a DNS server is provided in the high-level computer, alternatively as shown in FIG. 4 it is possible for the injection molding machines to be each given a DNS server function so that they can conduct exchange of information and so on via the Internet individually.

Next, the destination mail address setting means and the automatic electronic mail distributing means will be described. The function achieved by these means will be called an advance notification mail transmission function.

The destination mail address setting means pre-sets transmission addresses to which advance notification that a predetermined event is to occur at a molding machine is to be automatically transmitted. The automatic electronic mail distributing means, before a predetermined event occurs at a molding machine, automatically distributes advance notification thereof by electronic mail to the destination addresses set by the destination mail address setting means. The predetermined event is for example production run completion, case completion, a lot change, a feedstock interchange, a molding machine stoppage, or a motor problem.

The automatic electronic mail distributing means is made up of an advance event notification program stored in the memory part of the process controller and an automatic mail distribution program of the high-level computer. The advance event notification program is run in free time provided at predetermined time intervals in the normal control of the molding machine by the control program.

Figure 5:
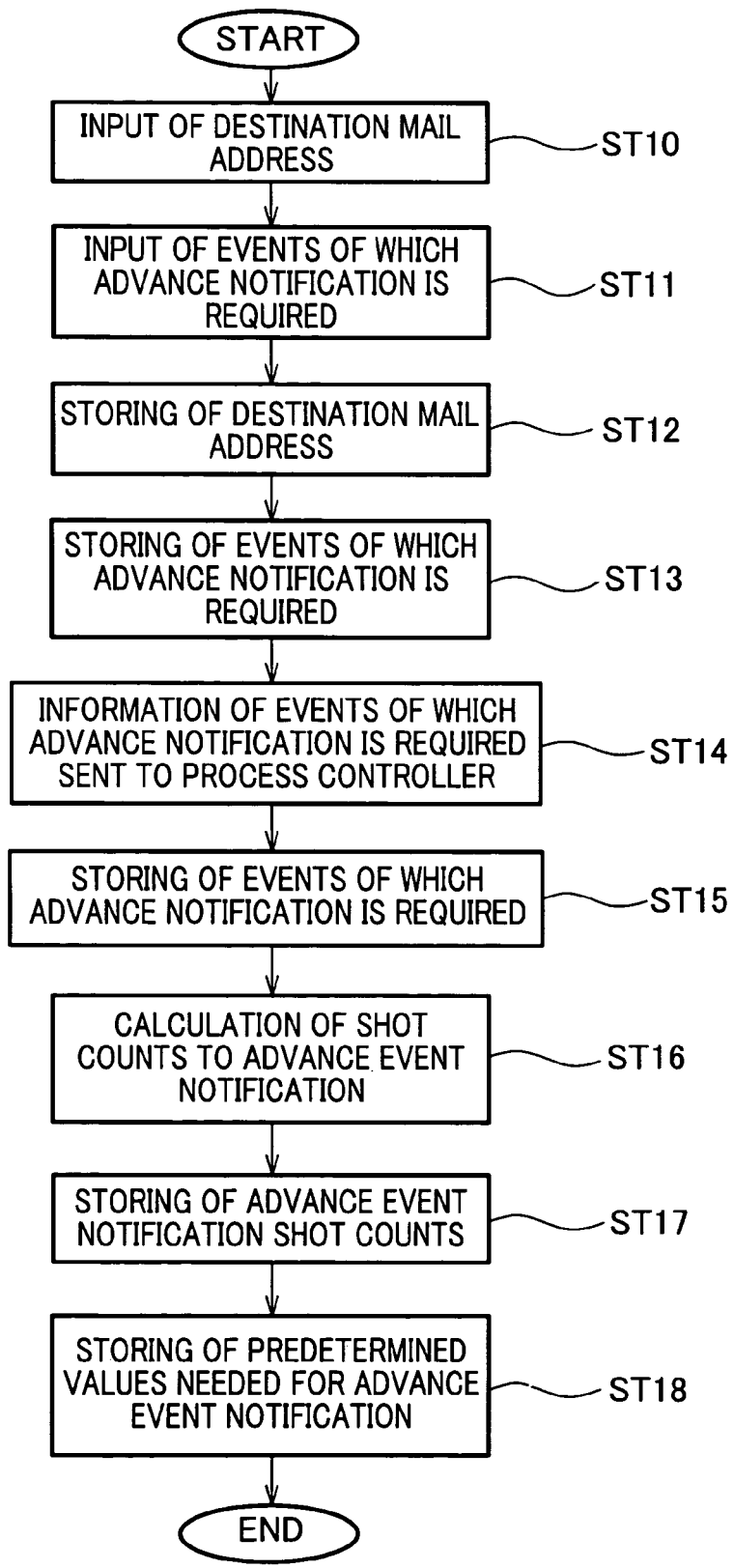
FIG. 5 is a flow chart of a setting program of destination mail address setting means of the first preferred embodiment.

FIG. 5 is a flow chart of a setting program of the destination mail address setting means.

First, in a step (step will be abbreviated to ST) 10, a destination mail address is inputted to the high-level computer.

In ST11, events of which advance notification is required, such as production run completion, case completion, a lot change, a feedstock interchange, a molding machine stoppage, or a motor problem, are inputted.

In ST12, the destination mail address is stored in the memory part of the high-level computer.

In ST13, the events of which advance notification is required are stored in the memory part.

In ST14, the events of which advance notification is required are transmitted to the process controller.

In ST15, the process controller stores the events of which advance notification is required in its memory part in accordance with the program for use at the time of address setting.

In ST16, the process controller calculates a shot count (advance event notification shot count) at which advance event notification is to be carried out, on the basis of the time taken by one shot.

In ST17, an advance event notification shot count is stored in the memory part for each of the events.

In ST18, predetermined values for monitor data needed for carrying out advance event notification of a molding machine stoppage are stored.

Figure 6A:
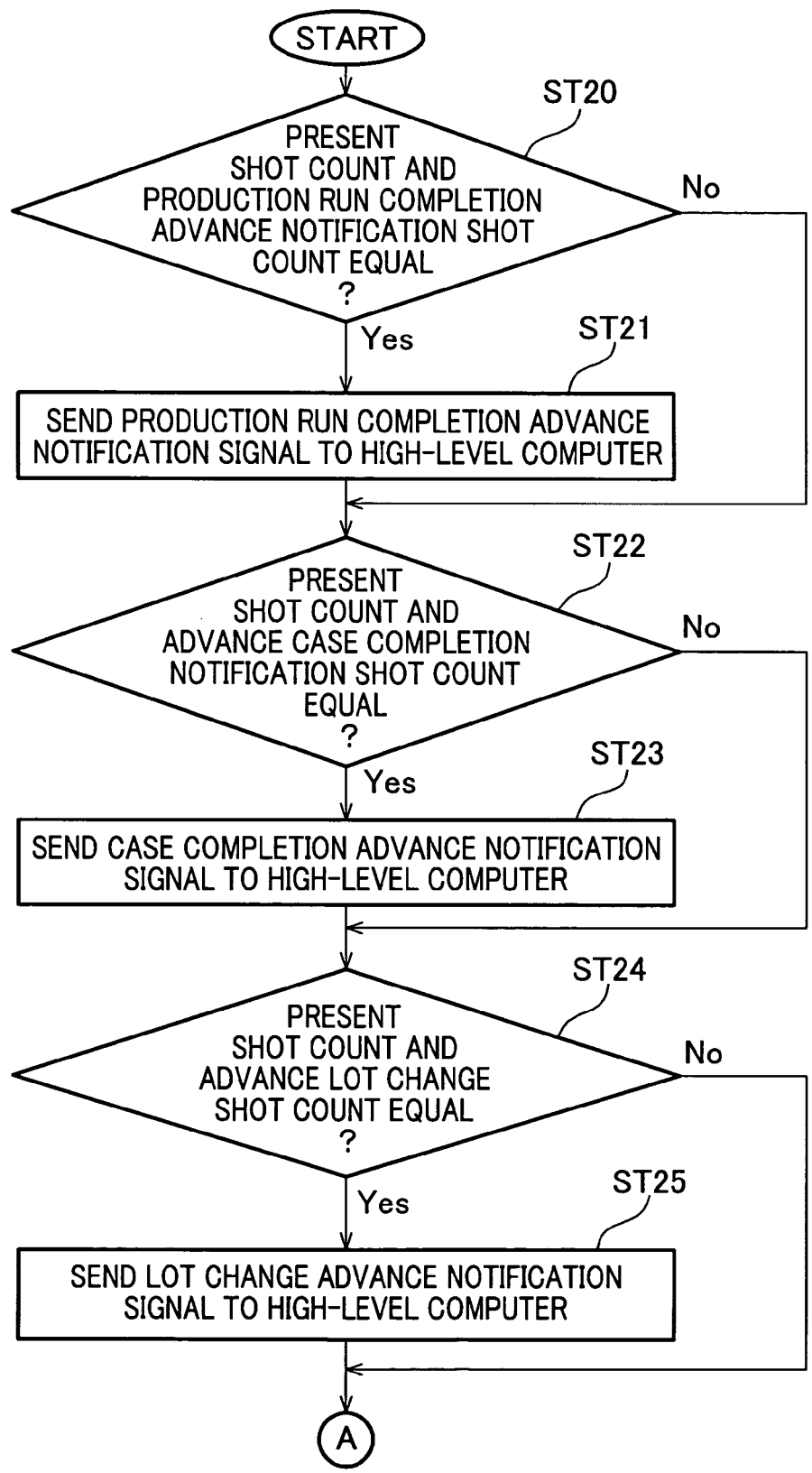
FIG. 6A and FIG. 6B are flow charts of an advance event notification program of the first preferred embodiment.
Figure 6B:
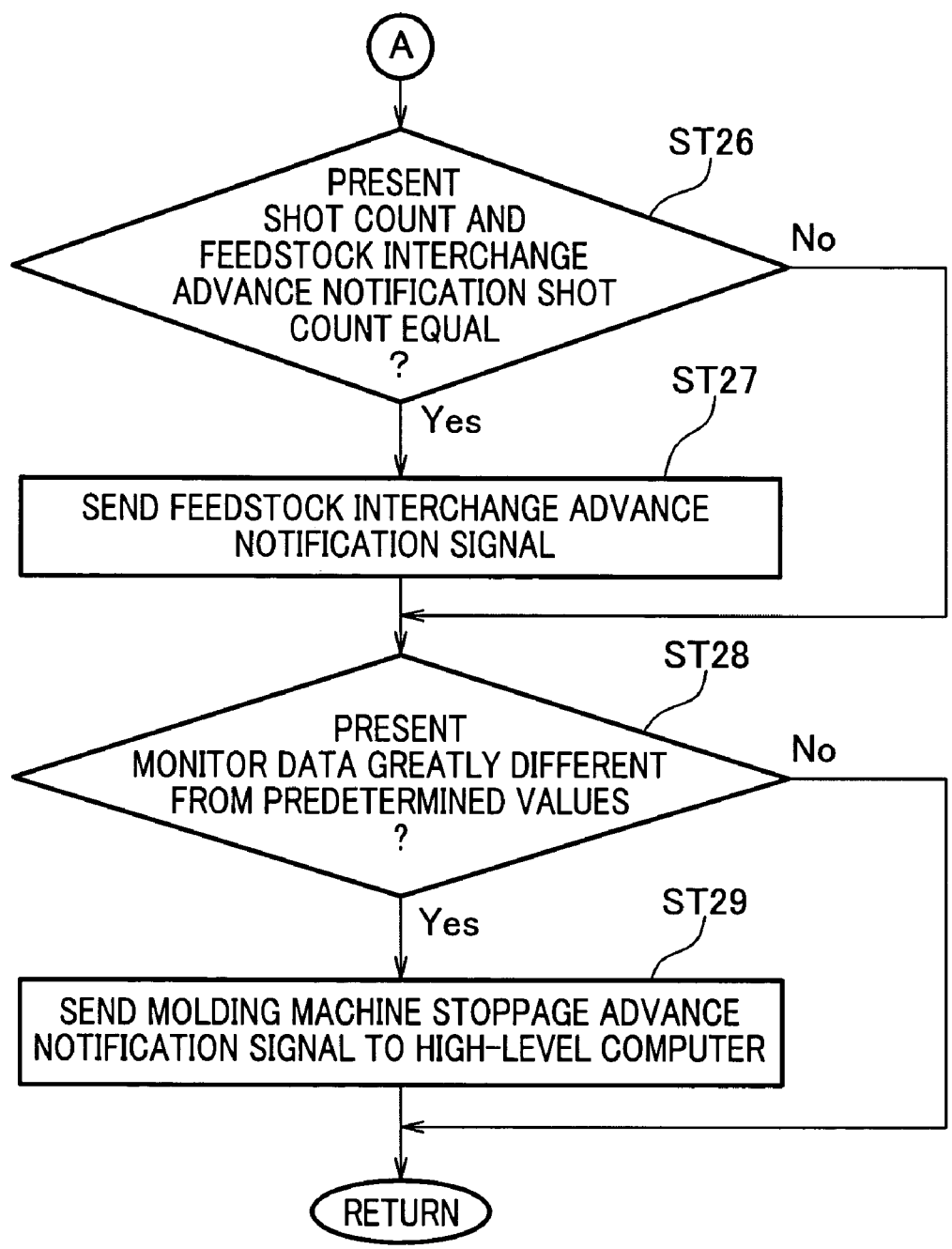

Next, the advance event notification program will be described, on the basis of the flow chart shown in FIG. 6A and FIG. 6B. This program starts each time a cycle of control of the molding machine ends.

First, in ST20, the present shot count stored in the memory part 156 and an advance notification of production run completion shot count stored in the memory part 156 by the program for use at the time of address setting are compared. When the present shot count is smaller than the advance notification of production run completion shot count, processing proceeds to step ST22. When the present shot count is equal to the advance notification of production run completion shot count, processing proceeds to ST21 and sends an advance notification of production run completion signal to the high-level computer 140.

In ST22, the present shot count stored in the memory part 156 and an advance notification of case completion shot count stored in the memory part 156 by the program for use at the time of address setting are compared. When the present shot count stored in the memory part 156 is smaller than the advance notification of case completion shot count stored in the memory part 156, processing proceeds to step ST24. When the present shot count stored in the memory part 156 is equal to the advance notification of case completion shot count stored in the memory part 156, processing proceeds to ST23 and sends an advance notification of case completion signal to the high-level computer 140.

In ST24, the present shot count stored in the memory part 156 and an advance notification of lot change shot count stored in the memory part 156 are compared. When the present shot count stored in the memory part 156 is smaller than the advance notification of lot change shot count stored in the memory part 156, processing proceeds to step ST26. When the present shot count stored in the memory part 156 is equal to the advance notification of lot change shot count stored in the memory part 156, processing proceeds to ST25 and sends an advance notification of lot change signal to the high-level computer 140.

In ST26, the present shot count stored in the memory part 156 and an advance notification of feedstock interchange shot count stored in the memory part 156 are compared. When the present shot count stored in the memory part 156 is smaller than the advance notification of feedstock interchange shot count stored in the memory part 156, processing proceeds to step ST28. When the present shot count stored in the memory part 156 is equal to the advance notification of feedstock interchange shot count stored in the memory part 156, processing proceeds to ST27 and sends an advance notification of feedstock interchange signal to the high-level computer 140.

In ST28, monitor data stored in the memory part 156 and set values stored in the memory part 156 are compared. When the monitor data stored in the memory part 156 are not greatly different from the predetermined values stored in the memory part 156, processing Returns. When the monitor data stored in the memory part 156 are greatly different from the predetermined values stored in the memory part 156, processing proceeds to ST29 and sends an advance notification of molding machine stoppage signal to the high-level computer 140. This monitor data includes a motor torque monitor.

After that, processing returns to the molding machine control program. Then, when the next cycle has finished, the advance event notification program starts again.

Next, the automatic electronic mail distributing program of the automatic electronic mail distributing means will be described, on the basis of the flow chart shown in FIG. 7A, FIG. 7B and FIG. 7C.

Figure 7A:
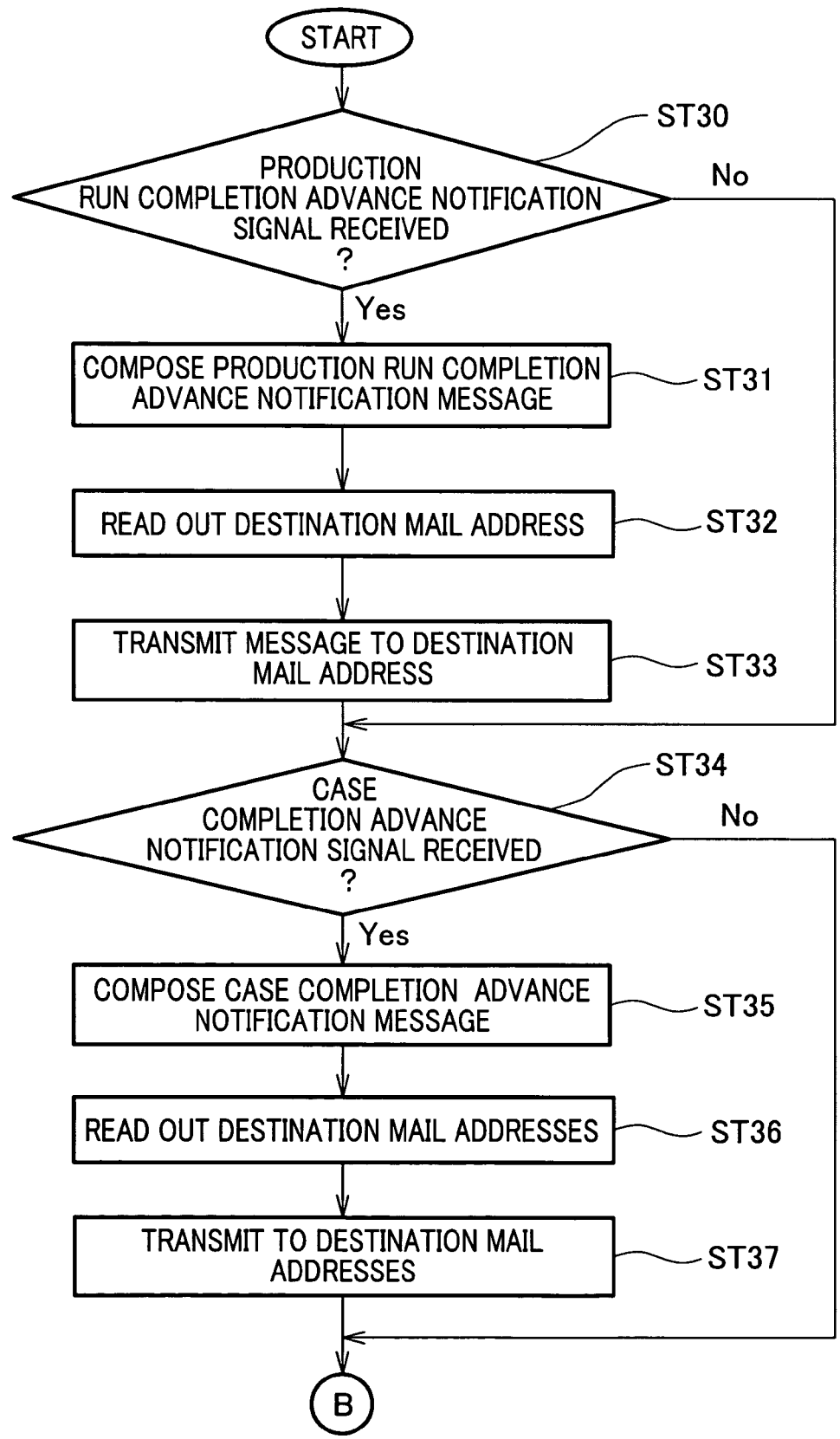

In FIG. 7A, in ST30, it is determined whether or not an advance notification of production run completion signal has been received from the high-level computer 140. When an advance notification of production run completion signal has been received, processing proceeds to ST31, and when none has been received, processing proceeds to ST34.

In ST31, if the high-level computer 140 has received an advance notification of production run completion signal from the process controller 150, it composes an advance notification of production run completion message from a transmission time, a molding machine number and an estimated production run completion time included in the advance notification of production run completion signal and an advance notification of production run completion text read out from the memory part 140$b$.

In ST32, a destination mail address is read out from the memory part 140$b$.

In ST33, the advance notification of production run completion message is sent to the destination mail address.

In ST34, it is determined whether or not an advance notification of case completion signal has been received from the process controller 150. If an advance notification of case completion signal has been received from the process controller 150, processing proceeds to ST35, and if none has been received then processing proceeds to ST37.

In ST35, an advance notification of case completion message is composed from a transmission time, a molding machine number and an estimated case completion time included in the advance notification of case completion signal and an advance notification of case completion text read out from the memory part 140$b$.

In ST36, a destination mail address is read out from the memory part 140$b$.

In ST37, the advance notification of case completion message is sent to the destination mail address.

In ST38 shown in FIG. 7B, it is determined whether or not an advance notification of lot change signal has been received from the process controller 150. When an advance notification of lot change signal has been received, processing proceeds to ST39, and when none has been received processing proceeds to ST42.

In ST39, an advance notification of lot change message is composed from a transmission time, a molding machine number and an estimated lot change time included in the advance notification of lot change signal and an advance notification of lot change text read out from the memory part 140$b$.

In ST40, a destination mail address is read out from the memory part 140$b$.

In ST41, the advance notification of lot change message is sent to the destination mail address.

In ST42, it is determined whether or not an advance notification of feedstock interchange signal has been received from the process controller 150. When an advance notification of feedstock interchange signal has been received, processing proceeds to ST43, and when none has been received processing proceeds to ST46.

In ST43, when it is determined that an advance notification of feedstock interchange signal has been received from the process controller 150, an advance notification of feedstock interchange message is composed from a transmission time, a molding machine number and an estimated feedstock interchange time included in the advance notification of feedstock interchange signal and an advance notification of feedstock interchange text read out from the memory part 140$b$.

In ST44, a destination mail address is read out from the memory part 140$b$.

In ST45, the advance notification of feedstock interchange message is sent to the destination mail address.

Figure 7C:
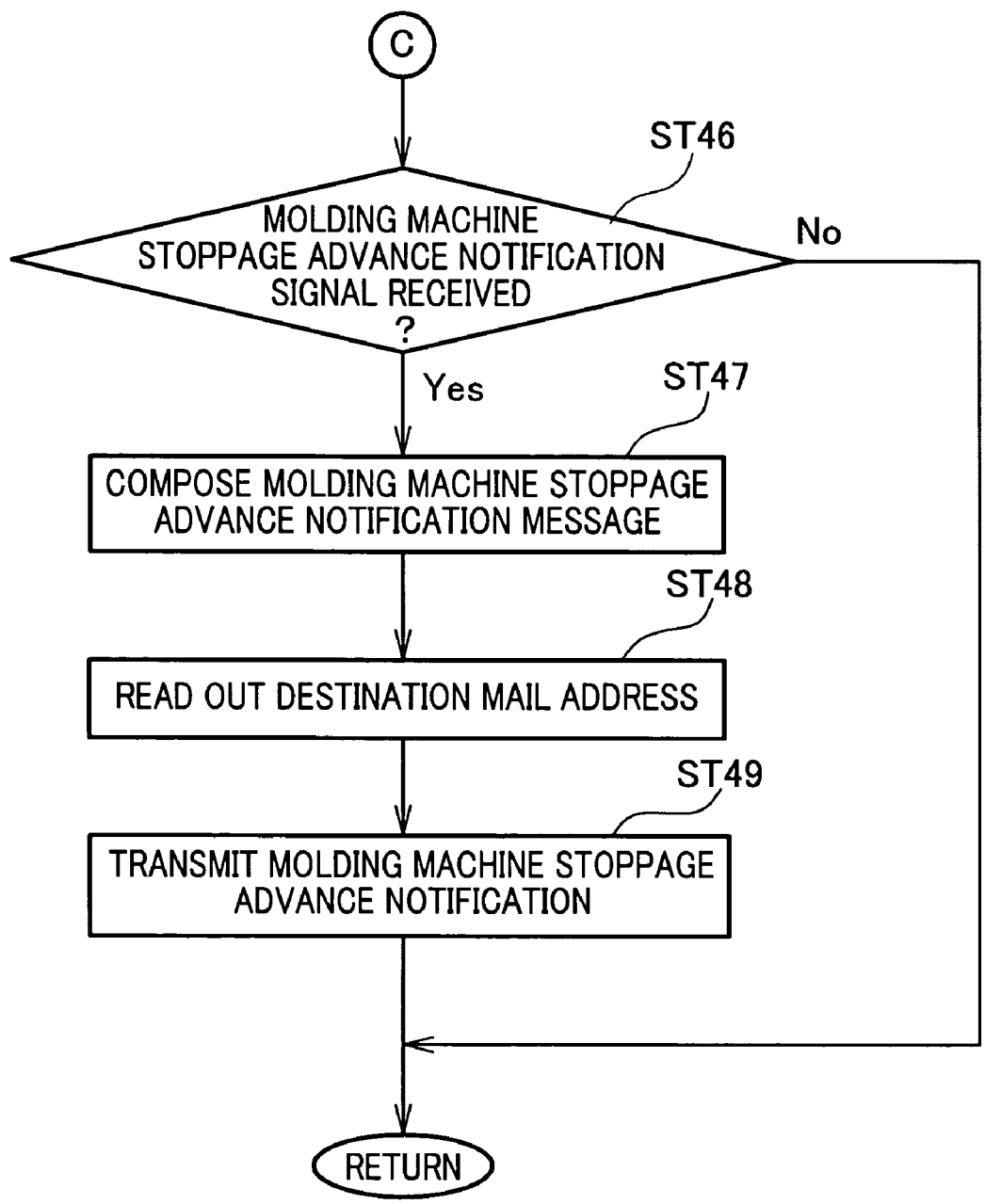

In ST46 shown in FIG. 7C, it is determined whether or not an advance notification of molding machine stoppage signal has been received from the process controller 150. When an advance notification of molding machine stoppage signal has been received, processing proceeds to ST47, and when none has been received, processing Returns.

When in ST47 the high-level computer 140 receives an advance notification of molding machine stoppage signal from the process controller 150, it composes an advance notification of molding machine stoppage message from a transmission time, a molding machine number and an estimated molding machine stoppage time included in the advance notification of molding machine stoppage signal and an advance notification of molding machine stoppage text read out from the memory part 140$b$.

In ST48, a destination mail address is read out from the memory part 140$b$.

In ST49, the advance notification of molding machine stoppage message is sent to the destination mail address, and then processing Returns.

Next, address setting using the destination mail address setting means and the operation of the automatic electronic mail distributing means will be described, on the basis of the destination mail address setting screen 180 shown in FIG. 8 and the event registration screen 184 shown in FIG. 9.

Figure 8:
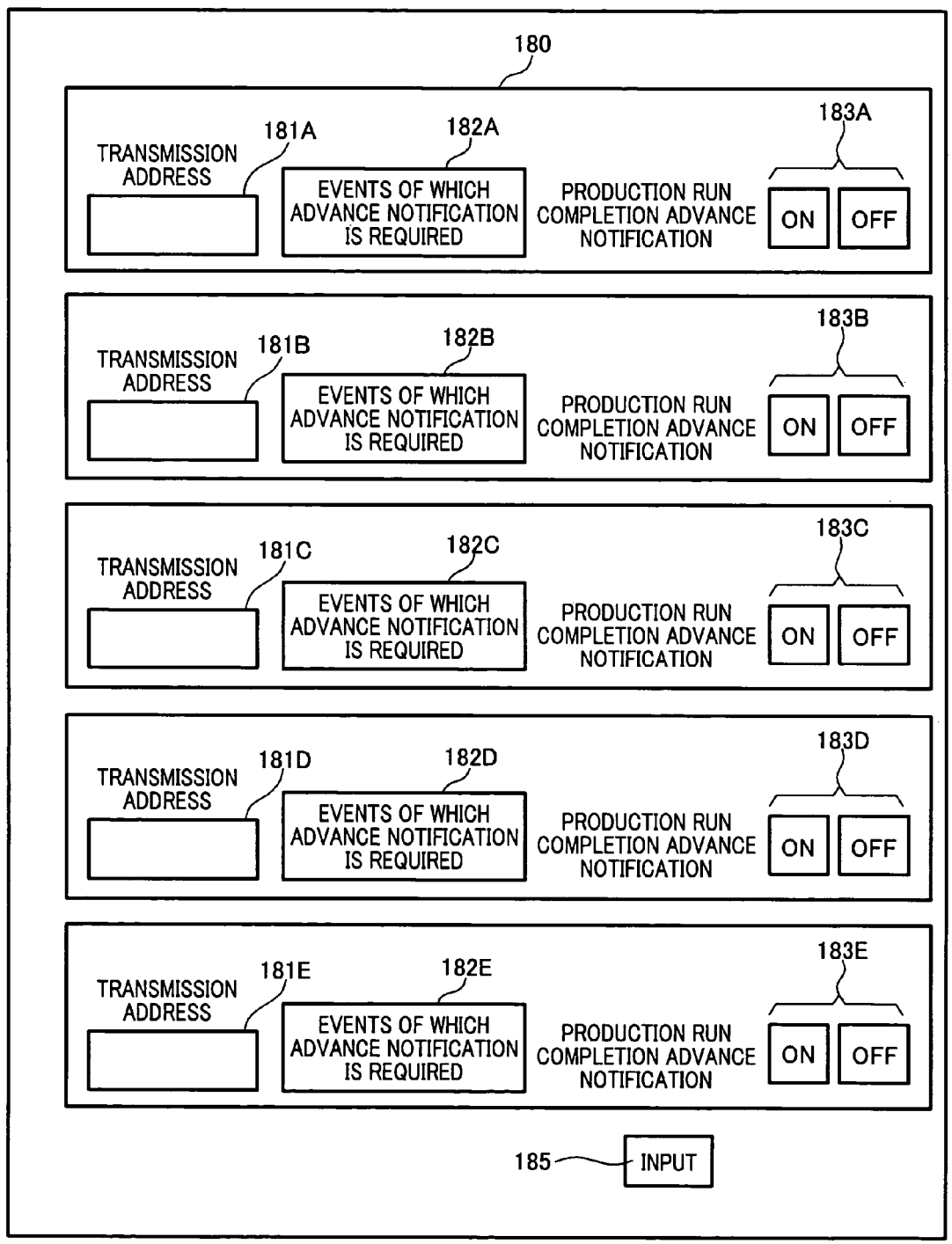
FIG. 8 is a view showing a destination mail address setting screen of the first preferred embodiment.

The destination mail address setting screen 180 shown in FIG. 8 is displayed on the display screen 140$c$ of the high-level computer 140 shown in FIG. 1 when the setting program of the destination mail address setting means is started.

The destination mail address setting screen 180 is made up of text boxes 181A, 181B, 181C, 181D and 181E for inputting destination mail addresses, event registration buttons 182A, 182B, 182C, 182D and 182E, and advance notification of production run completion buttons 183A, 183B, 183C, 183D and 183E.

The text boxes 181A, 181B, 181C, 181D and 181E are boxes for inputting destination mail addresses to be registered for electronic mail to be sent to.

The event registration buttons 182A, 182B, 182C, 182D and 182E are buttons for setting events of which advance notification is to be sent.

The advance notification of production run completion buttons 183A, 183B, 183C, 183D and 183E are buttons for setting whether or not advance notification of production run completion is to be sent.

At this destination mail address setting screen 180, first, the operator inputs a destination mail address into one of the text boxes 181A, 181B, 181C, 181D and 181E. Then, the operator clicks the respective event registration button 182A, 182B, 182C, 182D or 182E.

This clicking causes the event registration screen 184 shown in FIG. 9 to be displayed. At this screen, beside each event for which an electronic mail with an advance notification message must be sent, the ON button is clicked, and beside each event for which no electronic mail need be sent the OFF button is clicked.

Then, when advance notification of production run completion is required, the respective advance notification of production run completion button 183A, 183B, 183C, 183D or 183E is turned ON, and if it is not required, the respective advance notification of production run completion button 183A, 183B, 183C, 183D or 183E is turned OFF. After this, by clicking an input button 185, the destination mail addresses and events of which advance notification is required are stored in the memory part 140b, and the events of which advance notification is required are also sent to the process controller 150. This completes the destination mail address setting.

Next, as an example, the operation for advance notification of production run completion will be described. If as the molding machine operates the present shot count has reached the advance notification of production run completion shot count, an advance notification of production run completion signal is sent from the process controller 150 to the high-level computer 140. In the high-level computer 140 receiving this signal, an advance notification of production run completion message is made by the automatic mail distribution program, and this is sent to the registered destination mail address or addresses. Advance notification messages are sent in the same way to provide advance notifications of other events. In the case of an event for which the sending of an advance notification message is not necessary, the program skips the determination of that event and the processing which follows that in the flow chart shown in FIG. 6A and FIG. 6B. For example, when an advance notification of a lot change is not necessary, processing skips ST24 and ST25.

Because an advance notification mail is sent from the factory like this, just by opening the electronic mail the recipient can see the estimated production run completion time and ascertain the progress of production swiftly.

Next, a control system according to a second preferred embodiment of the invention will be described, on the basis of FIG. 10.

Figure 10:
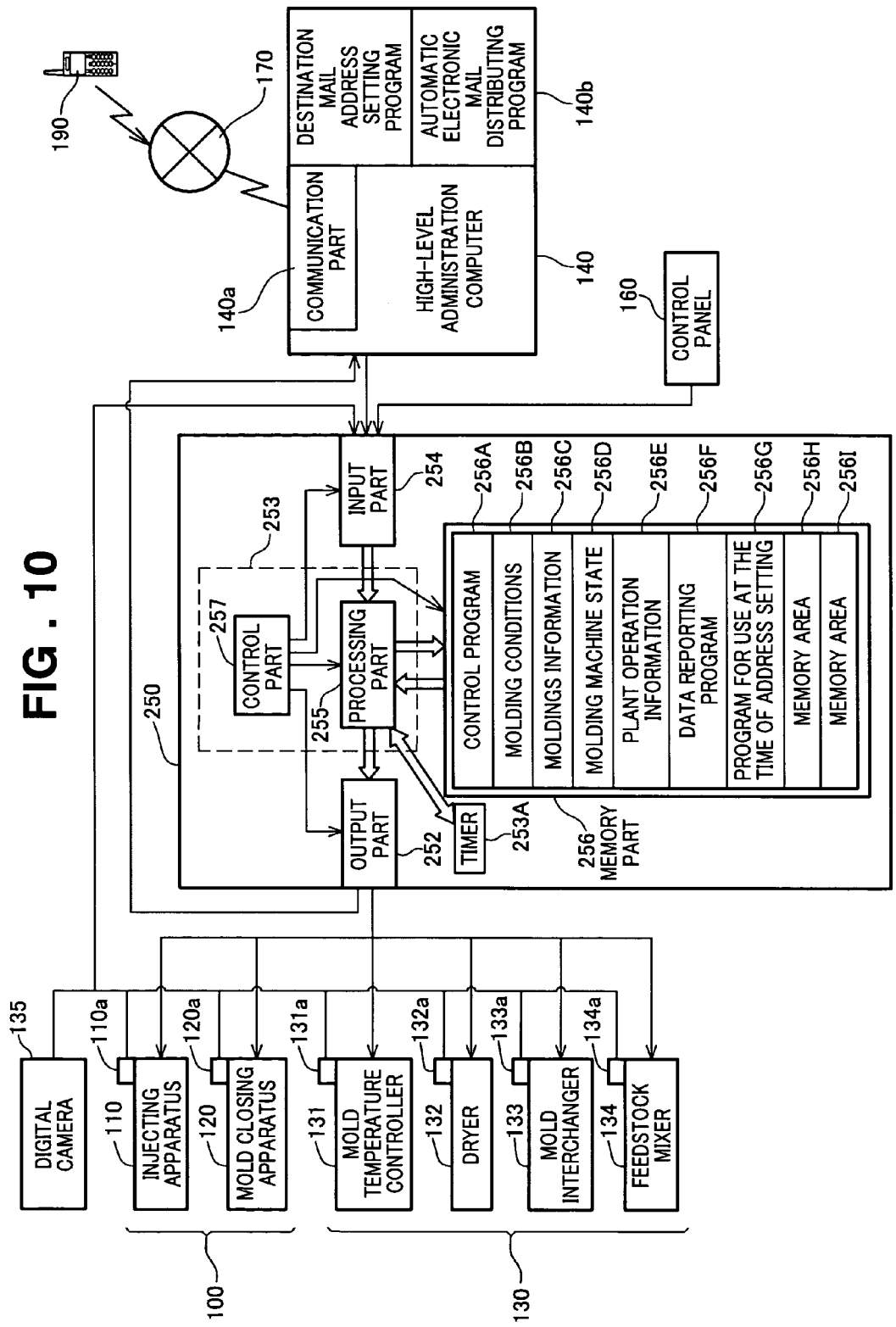
FIG. 10 is an electrical function block diagram showing the construction of a control system of a second preferred embodiment centered on a process controller.

In the description of the control system of this second preferred embodiment shown in FIG. 10, parts the same as parts in the block diagram of the control system shown in FIG. 2 as the first preferred embodiment have been given the same reference numerals and will not be explained in detail again here.

A process controller 250 is made up of an output part 252, a CPU 253, an input part 254, a memory part 256, and a timer 253A. The CPU 253 includes a processing part 255 and a control part 257.

The processing part 255 takes a control program and data relating to various information such as molding conditions from the memory part 256 and controls the operation of an injection molding machine 100 and the operation of peripheral machines 130 to execute continuous production of moldings by injection molding and maintain the injection molding plant operation/running of the injection molding machine 100.

The memory part 256 stores at least a control program 256A for various operations, molding conditions data 256B, moldings information data 256C, data 256D relating to the state of the injection molding machine 100, and data 256E relating to plant operation information.

Also, the memory part 256 has a data reporting program 256F, a program for use at the time of address setting 256G, and memory areas 256H, 256I for storing predetermined times and items to be reported, all of which will be discussed in detail later.

Included in the control program 256A is information relating to operation control of the injection molding machine 100, operation control of various devices included in the peripheral machines 130, and a production plan.

Included in the data 256D relating to the state of the molding machine are for example the I/O state of the injection molding machine 100, pump command values, motor command values, a motor load torque monitor, detector voltages and other maintenance information, error occurrence data, and production number states. Also included are production data such as molding conditions and plant operation status, fulfillment rate, plant operation rate, number of good units and number of defective units, which are results data, and cycle time, lot number, product number, planned production number, number of cavities, and estimated time of production run completion, which are data attendant to results data.

Included in the moldings information data 256C are for example shot-by-shot monitor data and molding image data. The molding image data is obtained as images of moldings picked up by the digital camera 135 mounted in the vicinity of the mold closing apparatus 120 of the injection molding machine 100.

Included in the plant operation information data 256E are data relating to the plant operation state of the injection molding machine 100 and data relating to the plant operation states of the peripheral machines 130.

When the process controller 250 is constituted in a system such that it conducts communication with a high-level computer 140 in a remote location, in the memory part 256 a communication control program for executing communication with the high-level computer 140 is provided, and a communication control part is formed.

The above-mentioned programs and data can be written and read freely, and can be changed freely in accordance with circumstances. This writing/reading and changing of content can be carried out freely even from an outside, remote location. Thus the control programs and data can be changed in the production site where the injection molding machine 100 is located, or remote control from a remote location can be carried out.

The control part 257 controls the operations of the output part 252, the input part 254, the processing part 255 and the memory part 256, and administers the operation of the process controller 250 as a whole.

Next, the destination mail address setting means and the automatic electronic mail distributing means of this second preferred embodiment will be described. The function achieved by these means will be called a regular mail transmission function.

The destination mail address setting means pre-sets transmission addresses and transmission times and items of data to be transmitted, of results data to be transmitted automatically by electronic mail at predetermined times. The automatic electronic mail distributing means automatically distributes the predetermined results data by electronic mail to the destination mail addresses set with the destination mail address setting means at the predetermined times. The data transmitted is the mail transmission time, production data, and molding conditions. The production data is at least one item among plant operation status, cycle time, lot number, planned production number, fulfillment rate, plant operation rate, number of good units, number of defective units, number of cavities, and estimated time of production run completion.

Figure 11:
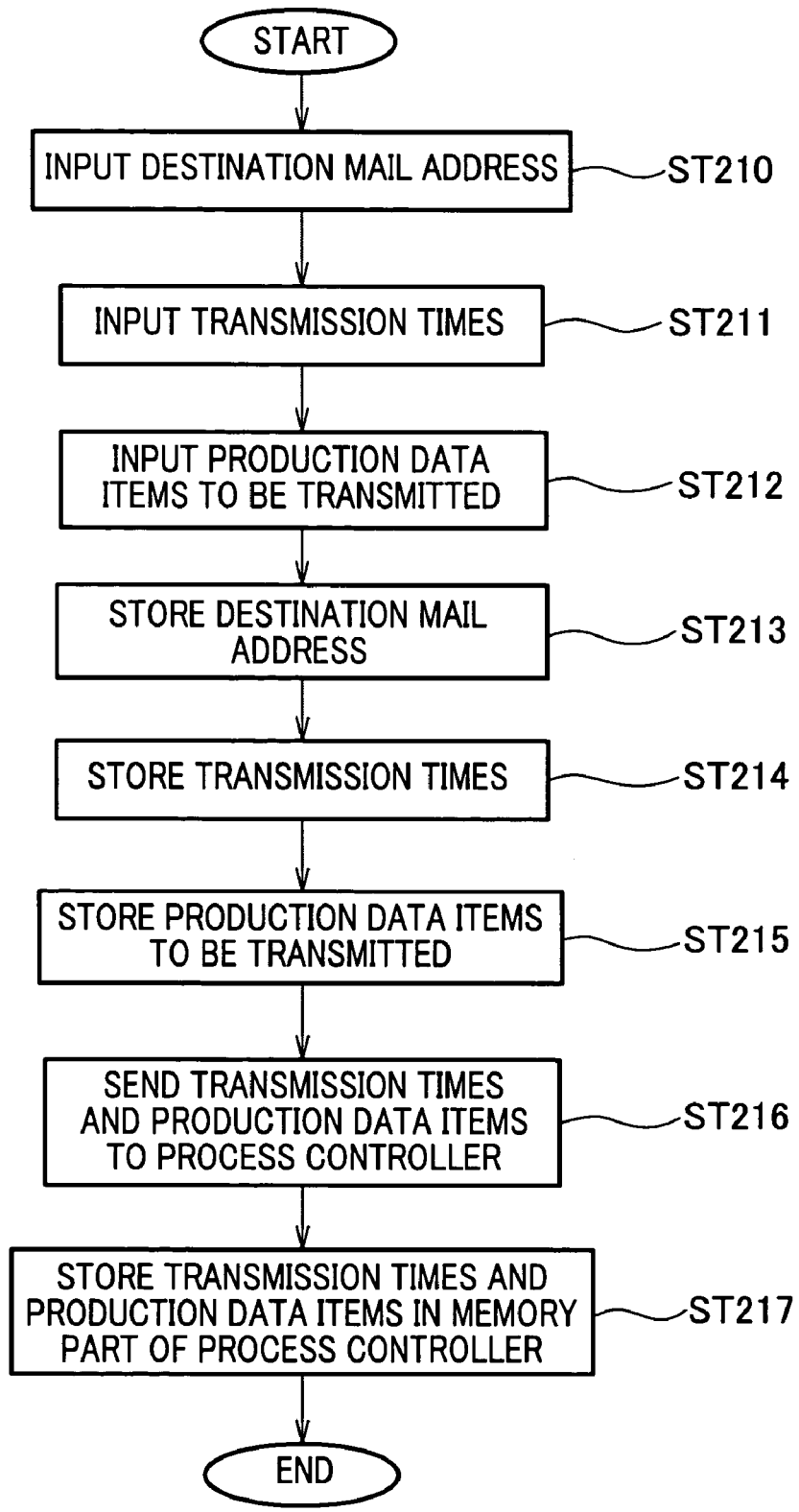
FIG. 11 is a flow chart of a setting program of destination mail address setting means of the second preferred embodiment.

The automatic electronic mail distributing means is made up of a data reporting program stored in the memory part of the process controller and an automatic mail distribution program of the high-level computer. The data reporting program is run in parallel with the normal control of the molding machine by the control program FIG. 11 is a flow chart of the setting program of the destination mail address setting means of this second preferred embodiment.

First, in ST210, a destination mail address is inputted to the high-level computer.

In ST211, a transmission time is inputted.

In ST212, at least one item of which transmission is required is inputted from among the production data of plant operation status, cycle time, lot number, planned production number, fulfillment rate, plant operation rate, number of good units, number of defective units, number of cavities, and estimated time of production run completion.

In ST213, the destination mail address is stored in the memory part of the high-level computer.

In ST214, the transmission time is stored in the memory part.

In ST215, the items of data of which transmission is required are stored in the memory part.

In ST216, the transmission time and the items of data of which transmission is required are sent to the process controller.

In ST217, the process controller stores the transmission times and data items of which transmission is required in its memory part in accordance with the program for use at the time of address setting.

Figure 12:
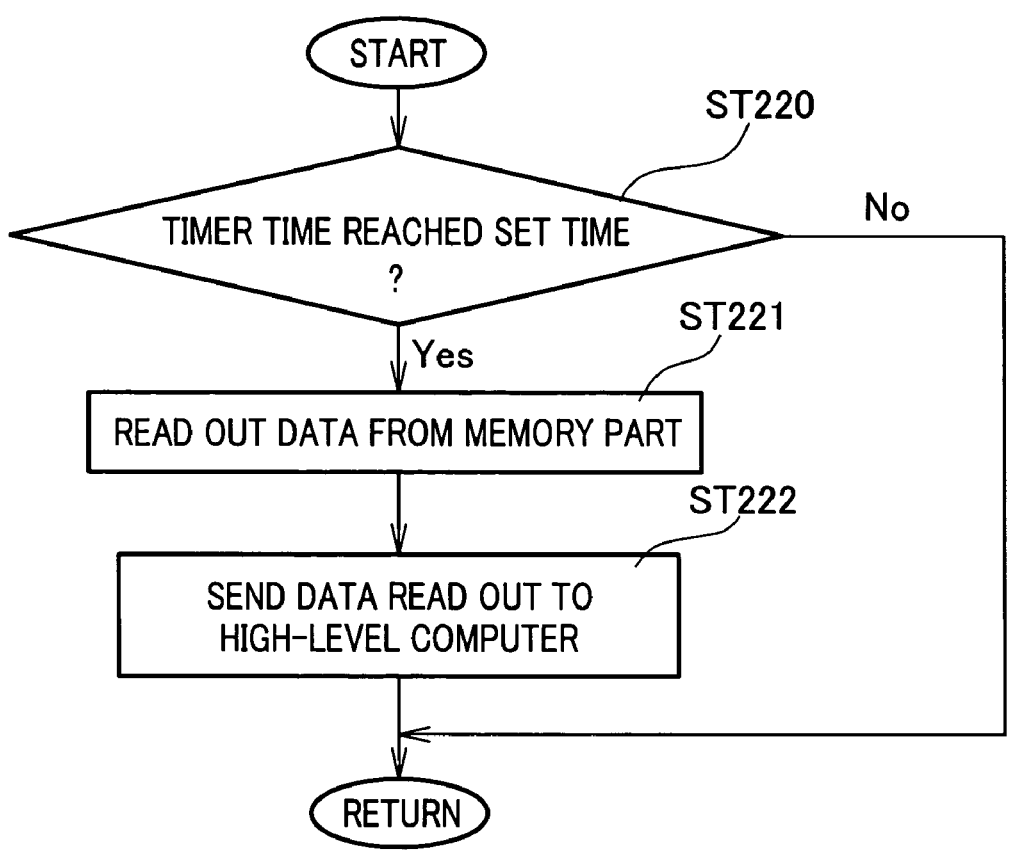
FIG. 12 is a flow chart of a data reporting program of the second preferred embodiment.

FIG. 12 is a flow chart of the data reporting program of the second preferred embodiment. This program is run and starts in parallel with the control of the molding machine.

First, in ST220, the time of the timer 253A shown in FIG. 10 and the set time stored in the memory part 256 are compared. When the present time and the stored set time are different, processing Returns. When the present time is equal to the set time stored in the memory part, processing proceeds to ST221.

In ST221, data corresponding to the data items of which transmission is required stored in the memory part are read out.

In ST222, the data read out is sent to the high-level computer 140. After that, processing Returns.

Figure 13:
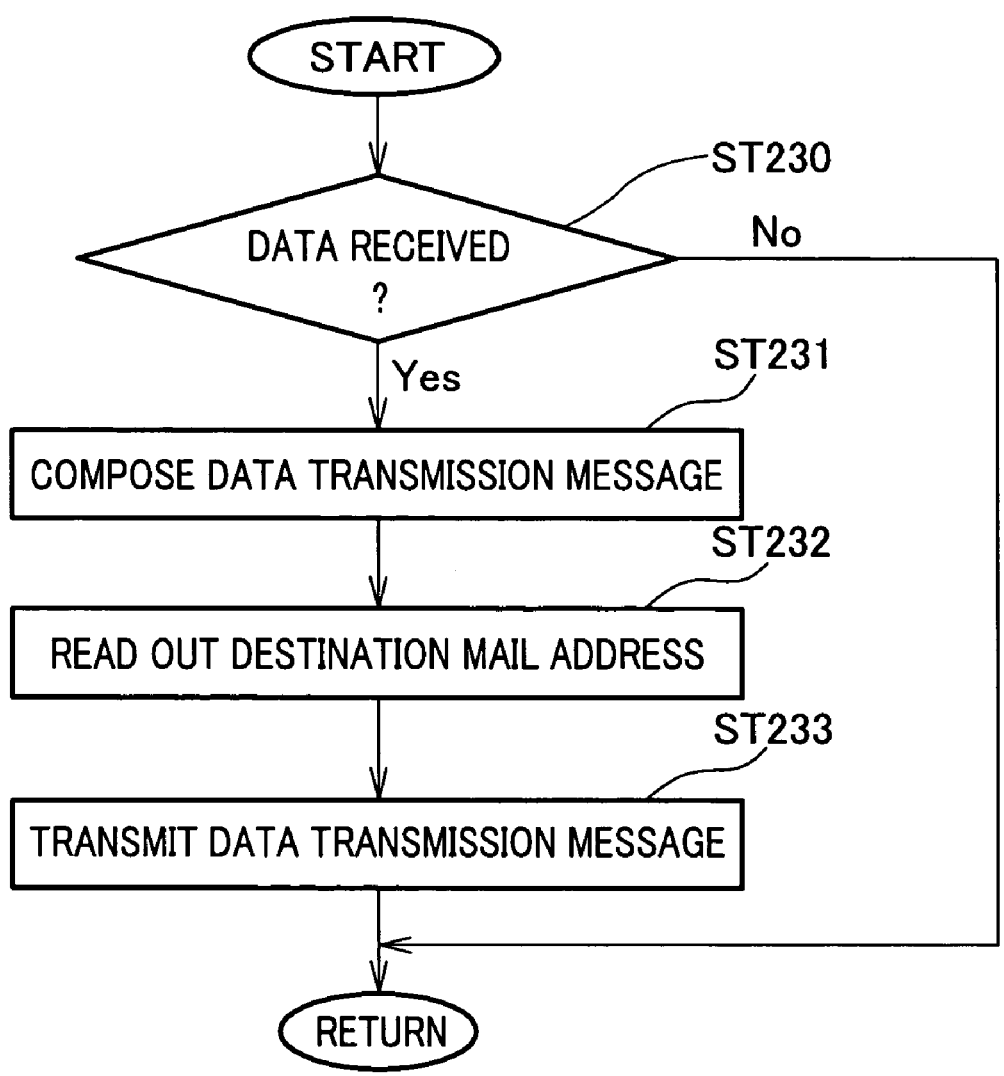
FIG. 13 is a flow chart of an automatic electronic mail distributing program of automatic electronic mail distributing means of the second preferred embodiment.

FIG. 13 is a flow chart showing the automatic electronic mail distributing program of the automatic electronic mail distributing means of the second preferred embodiment.

In ST230, the high-level computer 140 determines whether or not it has received data corresponding to the data items of which transmission is required from the process controller 250. When it has not, processing Returns, and when it has, processing proceeds to ST231.

In ST231, when the data is received from the process controller 250, a data transmission message is composed from the transmission time and the molding machine number and the above-mentioned data and a data reporting text read out from the memory part 140b.

In ST232, a destination mail address is read out from the memory part 140b.

In ST233, the data transmission message is sent to the destination mail address. After that, processing Returns.

Figure 14:
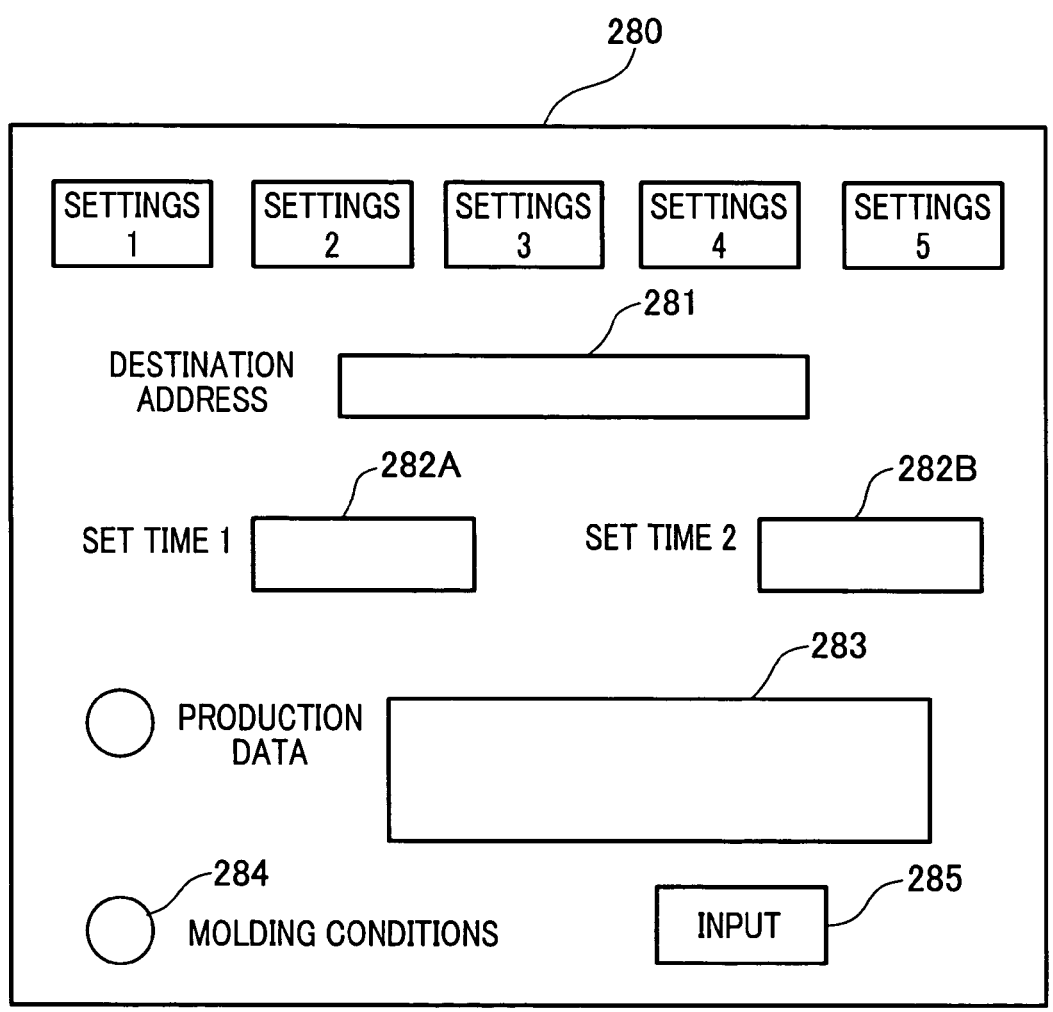
FIG. 14 is a view showing a destination mail address setting screen of the second preferred embodiment.

Next, address setting with the destination mail address setting means and the operation of the automatic electronic mail distributing program will be described, on the basis of the destination mail address setting screen 280 of the second preferred embodiment shown in FIG. 14.

This destination mail address setting screen 280 is displayed on the display screen 140c of the high-level computer 140 when the setting program of the destination mail address setting means is started.

The destination mail address setting screen 280 has screens of settings 1 through 5, and each screen is displayed when the respective setting is clicked. Because the setting screens of settings 1 through 5 are the same, here, the screen of setting 1 will be described.

The destination mail address setting screen 280 has a text box 281 for inputting a destination mail address, text boxes 282A, 282B for inputting transmission times, a text box 283 for inputting results data, and a molding conditions button 284.

The text box 281 is a box for inputting a destination mail address to be registered for electronic mail to be sent to. The text boxes 282A, 282B are boxes for setting transmission times. The text box 283 is a box for inputting data items to be transmitted. In the order in which data items are inputted to this text box 283, the data actually transmitted is also transmitted in order. The molding conditions button 284 is turned ON when the transmission of molding conditions is required, and OFF when the transmission of molding conditions is not required.

At the destination mail address setting screen 280, first, an operator inputs a destination mail address to the text box 281. Then, set times are inputted to the text boxes 282A, 282B. After that, data items of which transmission is required are inputted to the text box 283. Then, when molding conditions are required, the molding conditions button 284 is turned ON, and if they are not required the molding conditions button 284 is turned OFF. When an input button 285 is clicked, the destination mail address, the set times and the items of which transmission is required are stored in the memory part 140b, and also the set times and the items of which transmission is required are sent to the process controller 250. This completes destination mail address setting.

Next, the operation of the automatic electronic mail distributing means will be described.

When as the injection molding machine 100 operates the present time of the timer 253A reaches a set time, data is read out from the memory part 140b in accordance with the items of which transmission is required stored in the memory part 140b, and results data is transmitted to the high-level computer 140 from the process controller 250. On receiving this results data, in accordance with the automatic electronic mail distributing program, the high-level computer 140 composes a data transmission message and transmits this message to the registered destination mail address.

Because mail is sent from the factory at fixed times like this, just by opening the electronic mail the recipient can see the plant operation status and the production results easily.

Next, a control system of a third preferred embodiment of the invention will be described, on the basis of FIG. 15. In the description of the control system of this third preferred embodiment shown in FIG. 15, parts the same as parts in the block diagram of the control system shown in FIG. 2 as the first preferred embodiment have been given the same reference numerals and will not be explained in detail again here.

A process controller 350 is made up of an output part 352, a CPU 353, an input part 354, and a memory part 356. The CPU 353 includes a processing part 355 and a control part 357.

The processing part 355 takes a control program and data relating to various information such as molding conditions from the memory part 356 and controls the operation of an injection molding machine 100 and the operation of peripheral machines 130 to execute continuous production of moldings by injection molding and maintain the injection molding plant operation/running of the injection molding machine 100.

The memory part 356 stores at least a control program 356A for various operations, molding conditions data 356B, moldings information data 356C, data 356D relating to the state of the injection molding machine 100, and data 356E relating to plant operation information.

Also, the memory part 356 has an event reporting program 356F, which will be discussed in detail later, a program for use at the time of address setting 356G, and memory area 356H for storing events of which reporting is required.

Included in the control program 356A is information relating to operation control of the injection molding machine 100, operation control of various devices included in the peripheral machines 130, and a production plan.

Included in the data 356D relating to the state of the molding machine are for example shot counts, the I/O state of the injection molding machine 100, pump command values, motor command values, a motor load torque monitor, detector voltages and other maintenance information, error occurrence data, and production number states.

Included in the moldings information 356C are for example shot-by-shot monitor data and molding image data. The molding image data is obtained as images of moldings picked up by the digital camera 135 mounted in the vicinity of the mold closing apparatus 120 of the injection molding machine 100.

Included in the plant operation information data 356E are data relating to the plant operation state of the injection molding machine 100 and data relating to the plant operation states of the peripheral machines 130.

When the process controller 350 is constituted in a system such that it conducts communication with a high-level computer 140 in a remote location, in the memory part 356 a communication control program for executing communication with the high-level computer 140 is provided, and a communication control part is formed.

The above-mentioned programs and data can be written and read freely, and can be changed freely in accordance with circumstances. And, this writing/reading and changing of content can be carried out freely even from an outside, remote location. Thus the control programs and data can be changed in the production site where the injection molding machine 100 is located, or remote control from a remote location can be carried out.

The control part 357 controls the operations of the output part 352, the input part 354, the processing part 355 and the memory part 356, and administers the operation of the process controller 350 as a whole.

Next, the destination mail address setting means and the automatic electronic mail distributing means of this third preferred embodiment will be described. The function achieved by these means will be called the monitor mail transmission function.

The destination mail address setting means pre-sets a transmission address to which a report that a predetermined event has occurred at the molding machine will be automatically sent by electronic mail. When the predetermined event occurs, the automatic electronic mail distributing means automatically distributes a predetermined event occurrence report by electronic mail to the destination address set with the destination mail address setting means. The predetermined event may be a change of molding conditions, a lot change, a case change, or a setup item or the like.

A change of molding conditions is a change of conditions made during work by a technician with the molding machine controller, and generally molding conditions are controlled by a person in charge of molds, a person in charge of quality, or a person responsible for the site. To maintain the quality of moldings, conditions changed by operators at their own discretion are monitored.

Lot changes are used to monitor the progress of production on the basis of when lot changes have taken place.

Case changes are monitored to carry out the processing of case output and the supplying of empty boxes smoothly.

Setup items are reported so that production can continue without delay when other setup work is necessary at or around the molding machine.

The automatic electronic mail distributing means is made up of an event reporting program stored in the memory part of the process controller and an automatic mail distribution program of the high-level computer.

FIG. 16 is a flow chart of the setting program of the destination mail address setting means of the third preferred embodiment.

First, in ST310, a destination mail address is inputted to the high-level computer 140.

In ST311, events of which reporting is required (reportable events) such as changes of molding conditions, lot changes, case changes, and setup items, are inputted.

In ST312, the destination mail address is stored in the memory part 140*b* of the high-level computer 140.

In ST313, the reportable events are stored in the memory part 140*b*.

In ST314, the reportable events are sent to the process controller 350.

In ST315, the process controller 350 stores the reportable events in the memory part 356 in accordance with the program for use at the time of address setting.

Figure 17A:
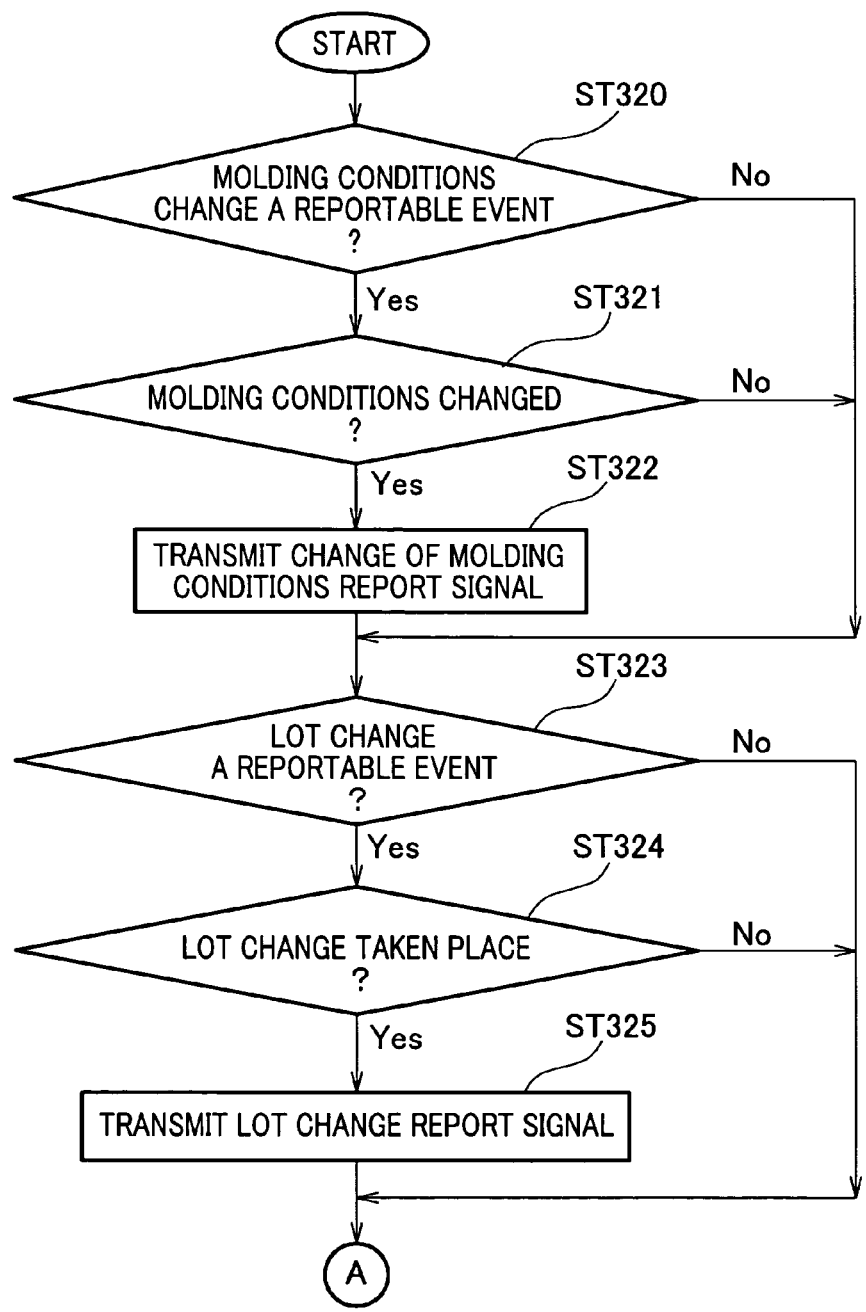
FIG. 17A and FIG. 17B are flow charts of an event reporting program of the third preferred embodiment.
Figure 17B:
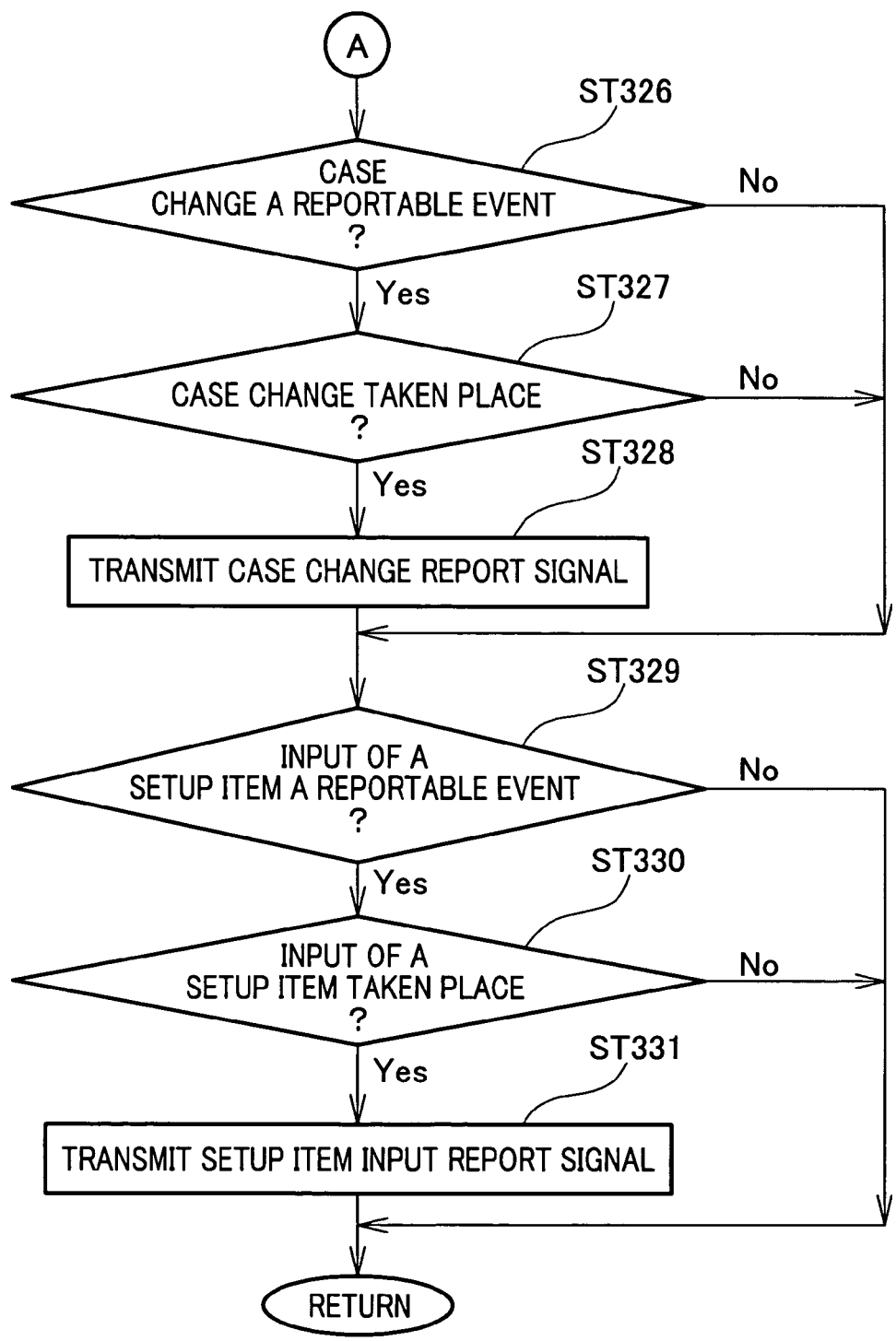

FIG. 17A and FIG. 17B show flow charts of the event reporting program 356F. This program starts each time a cycle of control of the molding machine ends.

Referring to FIG. 17A, in ST320, it is determined whether or not a change of molding conditions has been registered as a reportable event in the memory area 356H of the memory part 356. If a change of molding conditions has been registered as a reportable event, processing proceeds to ST321, and if a change of molding conditions has not been registered as a reportable event, processing proceeds to ST323.

In ST321, it is determined whether or not there has been a change of molding conditions. When there has been no change of molding conditions processing proceeds to ST323, and when there has been a change of molding conditions processing proceeds to ST322.

In ST322, a change of molding conditions report signal including the changed molding conditions data is sent to the high-level computer 140.

In ST323, it is determined whether or not a lot change has been registered as a reportable event in the memory area 356H. If a lot change has been registered as a reportable event, processing proceeds to ST324, and if a lot change has not been registered as a reportable event, processing proceeds to ST326.

In ST324, it is determined whether or not a lot change has been carried out. When a lot change has not been carried out, processing proceeds to ST326, and when a lot change has been carried out, processing proceeds to ST325.

ST325, a lot change signal is sent to the high-level computer 140.

In ST326 shown in FIG. 17B, it is determined whether or not a case change has been registered as a reportable event in the memory area 356H. If a case change has been registered as a reportable event, processing proceeds to ST327, and if a case change has not been registered as a reportable event, processing proceeds to ST329.

In ST327, it is determined whether or not a case change has been carried out. When a case change has not been carried out, processing proceeds to ST329, and when a case change has been carried out, processing proceeds to ST328.

In ST328, a case change signal is sent to the high-level computer 140.

In ST329, it is determined whether or not the input of a setup item has been registered as a reportable event in the memory area 356H. If the input of a setup item has been registered as a reportable event, processing proceeds to ST330, and if the input of a setup item has not been registered as a reportable event, processing returns to the control program of the injection molding machine 100.

In ST330, it is determined whether or not there has been an input of a setup item. When there has not been an input of a setup item, processing Returns. When there has been an input of a setup item, processing proceeds to ST331.

In ST331, a setup item input report signal is sent to the high-level computer 140. After that, processing returns to the control program of the molding machine. When the next cycle of the control program of the molding machine has finished, the event reporting program is started again.

Figure 18A:
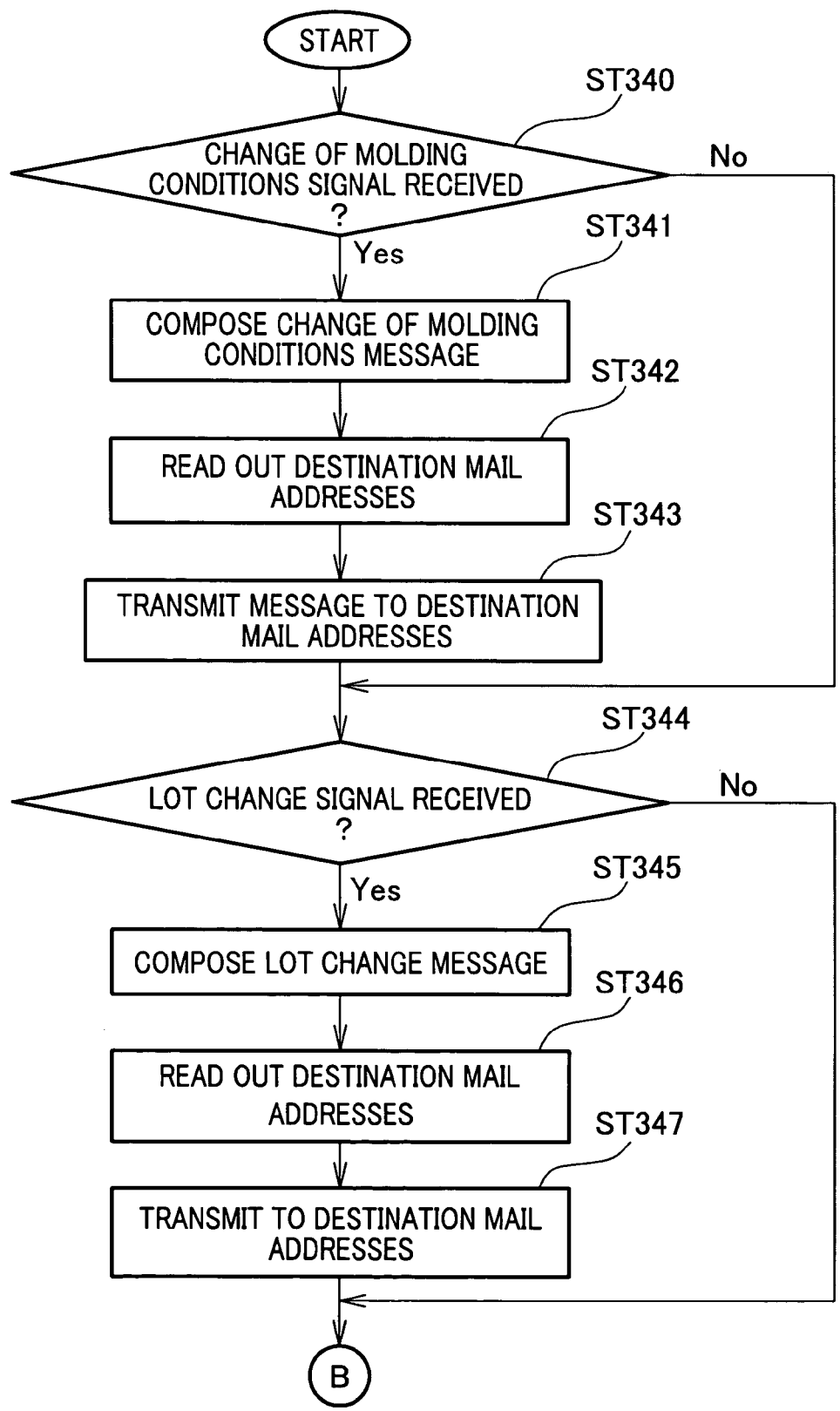
FIG. 18A and FIG. 18B are flow charts of an automatic electronic mail distributing program of automatic electronic mail distributing means of the third preferred embodiment.
Figure 18B:
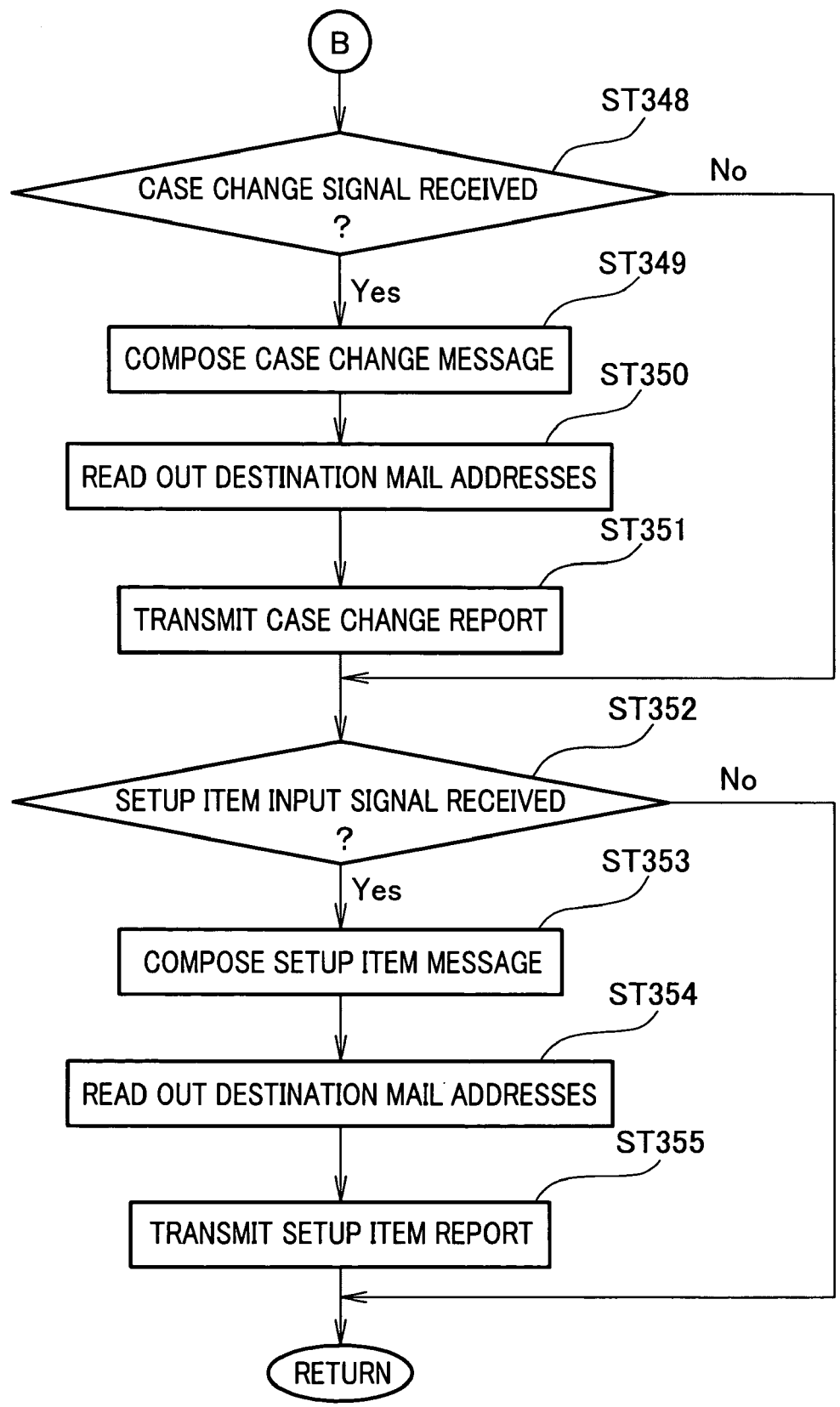

FIG. 18A and FIG. 18B are flow charts of the automatic electronic mail distributing program of the automatic electronic mail distributing means of the third preferred embodiment.

Referring to FIG. 18A, in ST340, it is determined whether or not the high-level computer 140 has received a change of molding conditions signal from the process controller 350. When it has received a change of molding conditions signal, processing proceeds to ST341, and when it has not received a change of molding conditions signal, processing proceeds to ST344.

In ST341, the high-level computer 140 composes a change of molding conditions message from molding conditions and a transmission time and a molding machine number included in the change of molding conditions signal and a change of molding conditions text read out from the memory part 140b.

In ST342, a destination mail address is read out from the memory part 140b.

In ST343, the change of molding conditions message is transmitted to the destination mail address.

In ST344, it is determined whether or not the high-level computer 140 has received a lot change signal from the process controller 350. When it has received a lot change signal processing proceeds to ST345, and when it has not received a lot change signal processing proceeds to ST348 shown in FIG. 18B.

In ST345, a lot change message is composed from a transmission time and a molding machine number and a lot change time included in the lot change signal and a lot change text read out from the memory part 140b.

In ST346, a destination mail address is read out from the memory part 140b.

In ST347, the lot change message is sent to the destination mail address.

In ST348 shown in FIG. 18B, it is determined whether or not the high-level computer 140 has received a case change signal from the process controller 350. When it has received a case change signal processing proceeds to ST349, and when it has not received a case change signal processing proceeds to ST352.

In ST349, a case change message is composed from a transmission time and a molding machine number and a case change time included in the case change signal and a case change text read out from the memory part 140b.

In ST350, a destination mail address is read out from the memory part 140b.

In ST351, the case change message is sent to the destination mail address.

In ST352, it is determined whether or not the high-level computer 140 has received a setup item signal from the process controller 350. When it has received a setup item signal processing proceeds to ST353, and when it has not received a setup item signal processing Returns.

In ST353, a setup item message is composed from a setup item and a transmission time and a molding machine number included in the setup item signal and a setup item text read out from the memory part 140b.

In ST354, a destination mail address is read out from the memory part 140b.

In ST355, the setup item message is sent to the destination mail address.

Next, address setting with the destination mail address setting means and the operation of the automatic electronic mail distributing means of the third preferred embodiment will be described, on the basis of the destination mail address setting screen 380 shown in FIG. 19 and the event registration screen 384 shown in FIG. 20.

Figure 19:
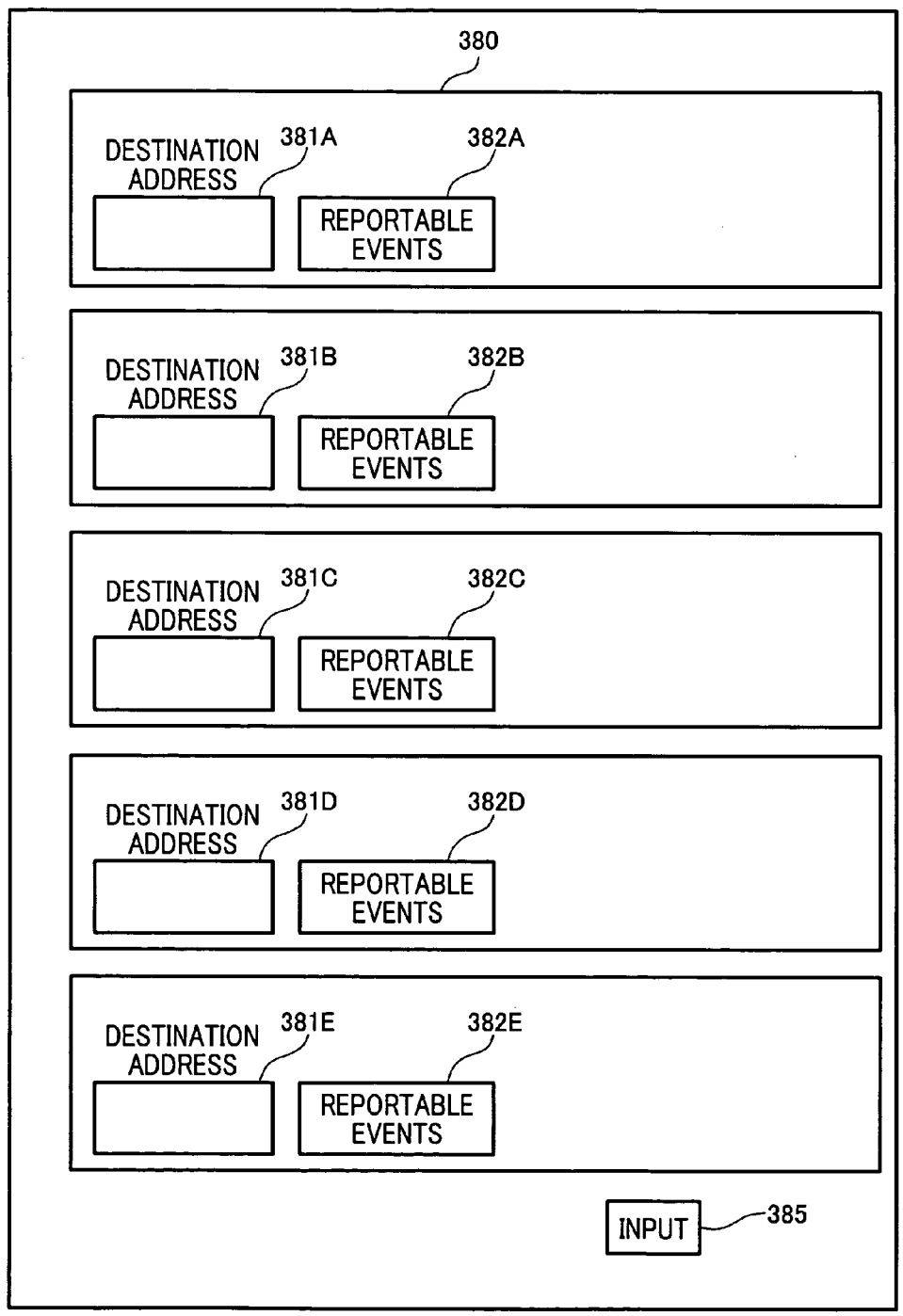
FIG. 19 is a view showing a destination mail address setting screen of the third preferred embodiment.

The destination mail address setting screen 380 shown in FIG. 19 is displayed on the display screen 140c of the high-level computer 140 shown in FIG. 1 when the setting program of the destination mail address setting means starts.

The destination mail address setting screen 380 is made up of text boxes 381A, 381B, 381C, 381D, 381E for inputting destination mail addresses, and event registration buttons 382A, 382B, 382C, 382D, 382E.

The text boxes 381A, 381B, 381C, 381D, 381E are boxes for inputting destination mail addresses to be registered for electronic mail to be sent to.

The event registration buttons 382A, 382B, 382C, 382D, 382E are buttons for setting events to be reported.

At this destination mail address setting screen 380, first, an operator inputs destination mail addresses to a text box 381A, 381B, 381C, 381D, 381E. Then, the event registration button 382A, 382B, 382C, 382D, 382E is clicked.

Figure 20:
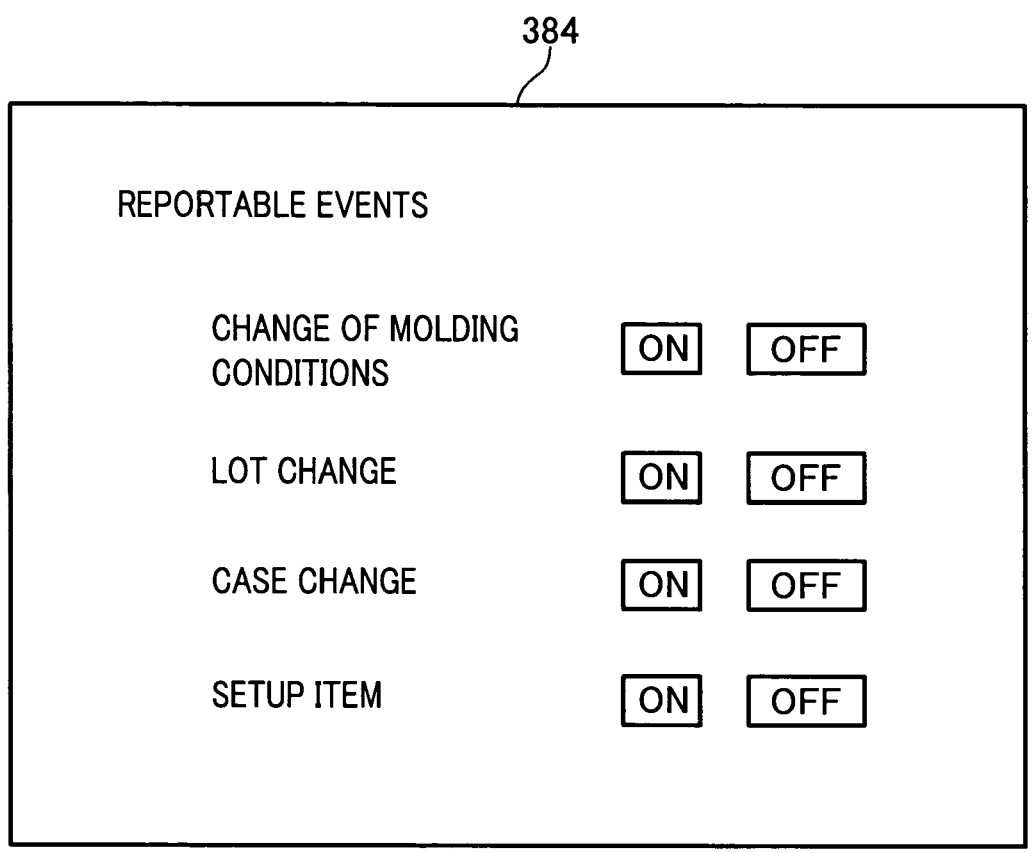
FIG. 20 is a reportable event registration screen of the third preferred embodiment.

This clicking causes the event registration screen 384 shown in FIG. 20 to be displayed. At this screen, for events of which an electronic mail with an event report message is to be sent, the ON button is clicked, and if transmission of an event report message is not necessary the OFF button is clicked. By an input button 385 being clicked, the destination mail address and the reportable events are stored in the memory part 140b, and the reportable events are also sent to the process controller 350. This completes the destination mail address setting.

Next, as an example, the operation of when a molding condition is changed will be explained. When a molding condition is changed at a molding machine, the process controller 350 sends a change of molding condition signal to the high-level computer 140. On receiving this signal, in accordance with the automatic mail distribution program, the high-level computer 140 composes a change of molding condition message and sends this to the registered destination mail addresses. Also with respect to reports of other events, report messages are sent in the same way.

Because an event report mail is sent from the factory like this, just by opening the electronic mail the recipient can see that the event has taken place, and can issue an instruction in response to the event from a remote location.

Although in the third preferred embodiment changes of molding conditions, lot changes, case changes and setup item plans were used as the predetermined events, besides these, production run completion, abnormality occurrence, device failure, and a running mode change, which is a change between an automatic mode and a manual mode, may be included.

Although in the first through third embodiments an injection molding machine was used as an example of a molding machine, there is no limit to this in the invention.

Although in the preferred embodiments described above a portable terminal was used as an example of means by which an administrator can obtain information in a remote location, any ordinary terminal device capable of connecting to the Internet can be used.

Also, although in the foregoing description the Internet was used as the electrical communication network, a LAN, a telephone line or a wireless line may alternatively be used.

Obviously, various minor changes and modifications of the present invention are possible in the light of the above teaching. It is therefore to be understood that within the scope of the appended claims the invention may be practiced otherwise than as specifically described.

What is claimed is:

1. A control system of a molding machine for controlling the operation of at least one molding machine and/or a plurality of peripheral machines supporting the running of the molding machine, the control system comprising:
a communication part connected to an electrical communication network, for effecting communication with an outside terminal via the electrical communication network;
transmission destination specifying means for automatically specifying a
transmission destination to be the destination of a notification of a predetermined event; automatic distributing means for automatically distributing the notification of the predetermined event to the transmission destination; and
transmitting means for transmitting the notification of the predetermined event to the transmission destinations;
said transmission destination specifying means includes pre-specifying means for, before a predetermined event occurs at the molding machine and/or the plurality of peripheral machines, automatically specifying in advance a transmission destination to be the destination of an advance notification of the event;
said automatic distributing means includes one-distributing means for, before the predetermined event occurs at the molding machine and/or the plurality of peripheral machines, automatically distributing an advance notification of the predetermined event to the transmission destination; and
said transmitting means includes pre-transmitting means for, before the predetermined event occurs at the molding machine and/or the plurality of peripheral machines, transmitting the advance notification of the predetermined event to the transmission destination
wherein the transmitting means is electronic mail.

2. A molding machine control system according to claim 1, wherein the predetermined event is completion of production.

3. A molding machine control system according to claim 1, wherein the predetermined event is at least one of completion of a case, a feedstock interchange, and the occurrence of an abnormality in the molding machine.

4. A molding machine control system according to claim 1, wherein the electrical communication network is any of an internet network, a LAN, a telephone line, and a wireless line.

5. A molding machine control system according to claim 1, wherein the outside terminal is either of a mobile telephone and a computer.

6. A molding machine control system according to claim 1, wherein
said transmission destination specifying means includes transmission at a predetermined time specifying means for automatically specifying transmission destination for production data of the molding machine to be transmitted at the predetermined time;
said automatic distributing means includes distribution at the predetermined time distributing means for automatically distributing the production data of the molding machine to the transmission destination specified by the transmission destination specifying means at the predetermined time; and
said transmitting means includes transmission at the predetermined time transmitting means for transmitting the production data of the molding machine to the transmission destination at the predetermined time.

7. A molding machine control system according to claim 6, wherein the production data includes at least one item from among plant operations status, fulfillment rate, plant operation rate, number of good units and number of defective units, which are results data, and cycle time, lot number, product number, planned production number, number of cavities, and estimated time of production run completion, which are data attendant to results data.

8. A molding machine control system according to claim 6, wherein the electrical communication network is any of an internet network, a LAN, a telephone line, and a wireless line.

9. A molding machine control system according to claim 6, wherein the transmitting means is electronic mail.

10. A molding machine control system according to claim 6, wherein the outside terminal is either of a mobile telephone and a computer.

11. A molding machine control system according to claim 1, wherein
said transmission destination specifying means includes post-specifying means for automatically specifying a transmission destination for, when a predetermined event has occurred at the molding machine, a report that the predetermined event has occurred to be transmitted to;
said automatic distributing means includes post-distributing means for, when a predetermined event has occurred at the molding machine, automatically distributing a report that the predetermined event has occurred to the transmission destination specified with the transmission destination specifying means; and
said transmitting means includes post-transmitting means for, when a predetermined event has occurred at the molding machine, transmitting a report that the event has occurred to the transmission destination.

12. A molding machine control system according to claim 11, wherein the predetermined event is at least one of a change of molding conditions, completion of production, an abnormality occurrence, a device failure, a running mode change, a lot change, a case change and a setup item plan.

13. A molding machine control system according to claim 11, wherein the electrical communication network is any of an internet network, a LAN, a telephone line, and a wireless line.

14. A molding machine control system according to claim 11, wherein the transmitting means is electronic mail.

15. A molding machine control system according to claim 11, wherein the outside terminal is either of a mobile telephone and a computer.

16. A control system of a molding machine for controlling the operation of at least one molding machine and/or a plurality of peripheral machines supporting the running of the molding machine, the control system comprising:
a communication part connected to an electrical communication network, for effecting communication with an outside terminal via the electrical communication network;
transmission destination specifying means for automatically specifying a transmission destination to be the destination of a notification of a predetermined event;
automatic distributing means for automatically distributing the notification of the predetermined event to the transmission destination; and
transmitting means for transmitting the notification of the predetermined event to the transmission destination;
said transmission destination specifying means includes transmission at a predetermined time specifying means for automatically specifying a transmission destination for production data of the molding machine to be transmitted at the predetermined time, transmission at a predetermined time being at least one fixed time during each production run;
said automatic distributing means includes distribution at the predetermined time distributing means for automatically distributing the production data of the molding machine to the transmission destination specified by the transmission destination specifying means at the predetermined time; and
said transmitting means includes transmission at the predetermined time transmitting means for transmitting the production data of the molding machine to the transmission destination at the predetermined time;
wherein the transmitting means is electronic mail.

17. A control system of a molding machine for controlling the operation of at least one molding machine and/or a plurality of peripheral machine supporting the running of the molding machine, the control system comprising:
a communication part connected to an electrical communication network, for effecting communication with an outside terminal via the electrical communication network;
transmission destination specifying means for automatically specifying a transmission destination to be the destination of notification of a predetermined event;
automatic distributing means for automatically distributing the notification of the predetermined event to the transmission destination; and
transmitting means for transmitting the notification of the predetermined event to the transmission destination;
said transmission destination specifying means includes post-specifying means for automatically specifying a transmission destination for, when the predetermined event has occurred at the molding machine, a report that the predetermined event has occurred to be transmitted to;
said automatic distributing means includes post-distributing means far, when the predetermined event has occurred at the molding machine, automatically distributing a report that the predetermined event has occurred to the transmission destination specified with the transmission destination specifying means; and
said transmitting means includes post-transmitting means for, when the predetermined event has occurred at the molding machine, transmitting a report that the event has occurred to the transmission destination;
the predetermined event being a change of molding conditions made by a technician during work on the molding machine control system, so as to monitor the change of molding conditions made;
wherein the transmitting means is electronic mail.

* * * * *